United States Patent
Yanagihara

(10) Patent No.: US 7,290,163 B2
(45) Date of Patent: Oct. 30, 2007

(54) METHOD AND CIRCUIT FOR DECIDING DATA TRANSFER RATE

(75) Inventor: Junichi Yanagihara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 722 days.

(21) Appl. No.: 10/259,516

(22) Filed: Sep. 30, 2002

(65) Prior Publication Data

US 2003/0110282 A1    Jun. 12, 2003

(30) Foreign Application Priority Data

Dec. 7, 2001    (JP)    ............................. 2001-373913

(51) Int. Cl.
  G06F 5/06    (2006.01)
  G06F 1/00    (2006.01)
  G06F 11/00    (2006.01)

(52) U.S. Cl. ..................... 713/600; 713/500; 370/232

(58) Field of Classification Search ................ 713/600, 713/500, 502; 370/232; 714/52; 709/228
See application file for complete search history.

(56) References Cited

U.S. PATENT DOCUMENTS 4,608,689 A * 8/1986 Sato ........................... 709/228
6,035,425 A * 3/2000 Caldwell et al. ............... 714/52
6,065,038 A * 5/2000 Chen ........................... 709/200
6,904,539 B2 * 6/2005 Ueno ........................... 713/500

FOREIGN PATENT DOCUMENTS

JP    05-236049       9/1993
JP    09331372 A    * 12/1997

* cited by examiner

Primary Examiner—Chun Cao
Assistant Examiner—Suresh K Suryawanshi
(74) Attorney, Agent, or Firm—Volentine & Whitt, P.L.L.C.

(57) ABSTRACT

A data transfer rate deciding method and circuit that can decide, upon reception of a data packet, whether a data transfer rate decided by a reception side is the same as that of data transferred by a transmission side. The method includes identifying a data transfer rate by a procedure performed before data transfer; regenerating a reception clock pulse based on a received signal upon data reception; comparing the reception clock pulse to a reference frequency clock pulse given on the basis of the data transfer rate identified by the procedure; and notifying as an error if the data transfer rate identified by the procedure is different from that of the received data.

13 Claims, 14 Drawing Sheets

METHOD AND CIRCUIT FOR DECIDING DATA TRANSFER RATE

BACKGROUND OF THE INVENTION

1. Field of the Invention

The invention relates to a method and circuit for deciding a data transfer rate and, more particularly to, a method and circuit for deciding a data transfer rate of the Ethernet (registered trade name) via a serial bus according to the IEEE 1394 Standard.

2. Description of the Related Art

According to the IEEE 1394 Standard, two pairs of twisted-pair signals (TPA/TPA*, TPB/TPB*) are used to carry out all the processes such as transmission/reception of data and arbitration between devices asking for assignment of the same resources. To interconnect apparatuses, a cross cable is used. That is, one of the TPA/TPA* terminals is connected with the other of the TPB/TPB* and, conversely, one of the TPB/TPB* terminals is connected with the other of the TPA/TPA* terminals.

Also, the IEEE 1394 Standard provides a plurality of data transfer rates of 100 Mbps, 200 Mbps, 400 Mbps, etc. The data transfer rate is notified of at the time of arbitration performed before transmission/reception of a data packet, when both the transmission side apparatus and the reception side apparatus pull a common mode signaling current through the TPB/TPB* terminals to then change a common mode voltage. Since they have been connected with a cross cable, conventionally both of the transmission side and reception side apparatuses have compared the common mode voltages at the respective TPA/TPA* terminals to each other, thus deciding the data transfer rate.

By this data transfer rate notification method, however, a common mode voltage is changed to decide a data transfer rate based on thus changed common mode voltage. In this case, however, the transmission side and reception side apparatuses may have different characteristics due to fluctuations in manufacture thereof and, therefore, may decide different data transfer rates. Also, the above-mentioned configuration is equipped with only a mechanism for notifying of a data transfer rate but not with means for deciding coincidence of the data transfer rate between the transmission side and the reception side, which has been a problem.

Also, to change a common mode voltage for notification of a data transfer rate, a common mode signaling current must be pulled in, thus contributing to an increase in a current dissipation.

Further, the above problem has occurred also on the Ethernet (registered trade name), which is another related art.

SUMMARY OF THE INVENTION

In view of the above, it is an object of the invention to provide a method and circuit for deciding a data transfer rate for deciding, upon reception of a data packet, whether a data transfer rate decided by a reception side and that of data actually transferred from a transmission side, without increasing a current dissipation.

To this end, the invention has employed the following solution.

A data transfer rate deciding method by the invention comprises the steps of: identifying a data transfer rate in a procedure performed before data is transferred; reproducing a reception clock pulse based on a received signal upon reception of the data; comparing said reception clock pulse to a reference frequency clock pulse given on the basis of the data transfer rate identified by said procedure; and notifying of an error if the data transfer rate identified by said procedure differs from that of said received data.

Another data transfer rate deciding method of the invention comprises the steps of: identifying a data transfer rate in a procedure performed before data packet is transferred; creating one pair of signals incorporated in the data packet upon reception thereof; reproducing a reception clock pulse based on said one pair of signals; comparing said reception clock pulse to a reference frequency clock pulse given on the basis of the data transfer rate identified by said procedure; and notifying of an error if the data transfer rate identified by said procedure differs from that of the received data packet.

A further data transfer rate deciding method of the invention for using at least two clock pulse regenerating means for outputting a reception clock pulse based on a signal incorporated in a data packet and another at least two transfer rate deciding means for deciding a data transfer rate by comparing said reception clock pulse to reference frequency clock pulses, wherein: when the data packet is received, one pair of signals incorporated in said data packet are created; said clock pulse regenerating means receives incoming said one pair of signals to then output the reception clock pulse based on said one pair of signals; one of said at least two kinds of reference frequency clock pulses having different frequencies and said reception clock pulse are input for each of said transfer rate deciding means, so that if the data transfer rate corresponding to a frequency of said one reference frequency clock pulse differs from the data transfer rate of the received data packet, an error is notified of to thus identify the data transfer rate of said received data packet.

A data transfer rate deciding circuit by the invention comprises: a clock pulse regenerating circuit for regenerating a reception clock pulse based on data upon reception of said data; and a transfer rate deciding circuit for comparing said reception clock pulse to a reference frequency clock pulse given on the basis of a data transfer rate identified by a procedure performed before transfer of said data to then notify of an error if said data transfer rate identified by said procedure differs from the data transfer rate of said received data.

Another data transfer rate deciding circuit of the invention comprises: a clock pulse regenerating circuit for regenerating a reception clock pulse based on a data packet upon reception of said data packet; and a transfer rate deciding circuit for comparing said reception clock pulse to a reference frequency clock pulse given on the basis of a data transfer rate identified by a procedure performed before transfer of said data packet to then notify of an error if said data transfer rate identified by said procedure differs from the data transfer rate of said received data packet.

A further data transfer rate deciding circuit of the invention comprises: at least two clock pulse regenerating circuits for regenerating a reception clock pulse based on a signal incorporated in a data packet upon reception of said data packet; another at least two transfer rate deciding circuits for deciding a data transfer rate by comparing said reception clock pulse to a reference frequency clock pulse, to notify of an error if the data transfer rate corresponding to a frequency of said reference frequency clock pulse differs from the data transfer rate of said received data packet, wherein for each of said transfer rate deciding circuits, the frequency of said reference frequency clock pulse is changed and then compared to said reception clock pulse to thereby identify the data transfer rate of the received data packet.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

DETAILED DESCRIPTION OF THE PREFERRED EMBODIMENTS

The following will describe preferred embodiments of a method and circuit for deciding a data transfer rate according to the invention with reference to the appended drawings. Note here that in the present specification and the drawings the components having the essentially the same functions are indicated by the same reference symbols and their explanation is omitted from the second time onward.

First Embodiment

Figure 1:
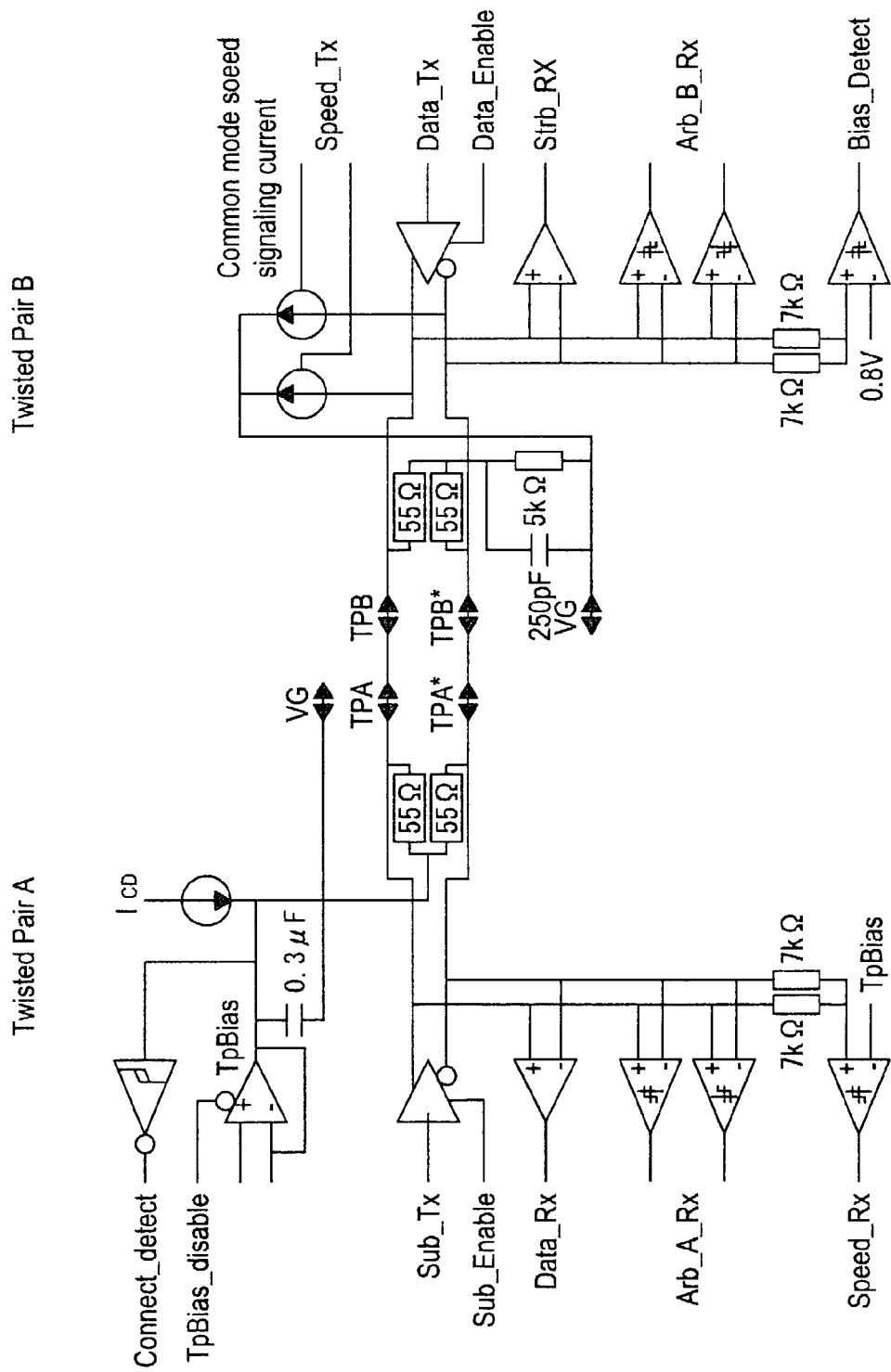
FIG. 1 is a circuit diagram for showing a cable media interface circuit.

FIG. 1 is a circuit diagram for showing a cable media interface section according to the IEEE 1394 Standard. According to the IEEE 1394 Standard, two pairs of twisted-pair signals (TPA/TPA*, TPB/TPB*) are used to carry out all the processes such as transmission/reception of data and arbitration between devices asking for assignment of the same resources. To interconnect apparatuses, a cross cable is used. That is, one of the TPA/TPA* terminals is connected with the other of the TPB/TPB* and, conversely, one of the TPB/TPB* terminals is connected with the other of the TPA/TPA* terminals.

Figure 2:
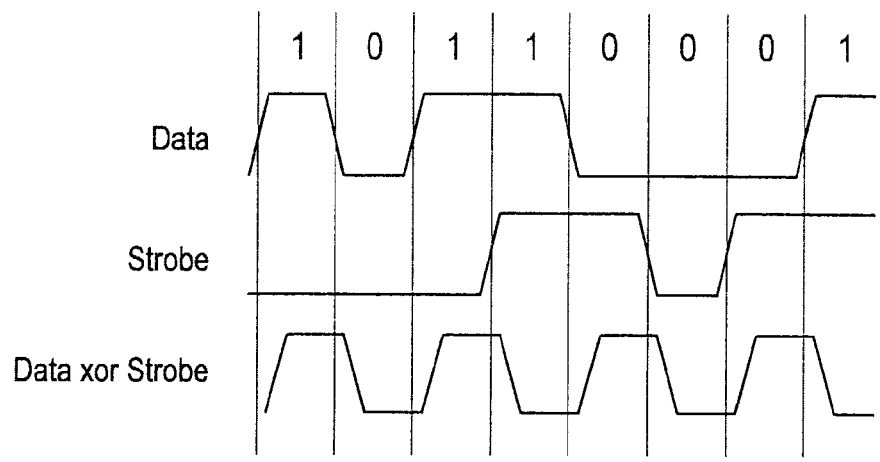
FIG. 2 is a timing chart for showing a data/strobe-signal encoding system.

Also, according to the IEEE 1394 Standard, a data/strobe-signal encoding system is employed for transmission/reception of data packets. FIG. 2 is a timing chart for showing the data/strobe-signal encoding system. As shown in FIG. 2, by the data/strobe-signal encoding system, data and a strobe signal are exclusive-OR tied to provide a clock pulse, at an edge of which the data is taken in.

Figure 3:
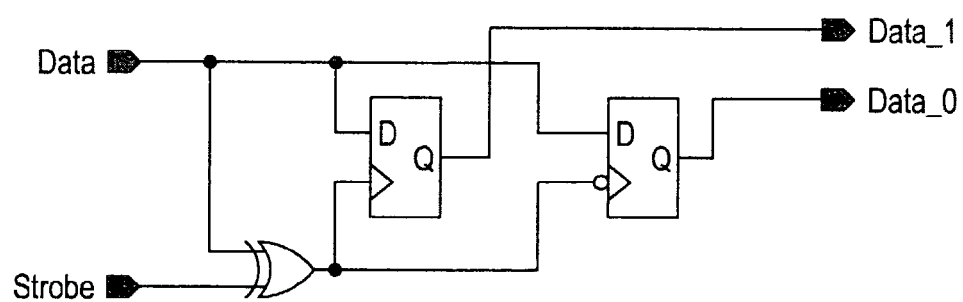
FIG. 3 is a circuit diagram for showing a data/strobe-signal decoding circuit.

FIG. 3 is a circuit diagram for showing a data/strobe-signal decoding circuit which is used by a reception side and also which is required in the data/strobe-signal encoding system.

Figure 4:
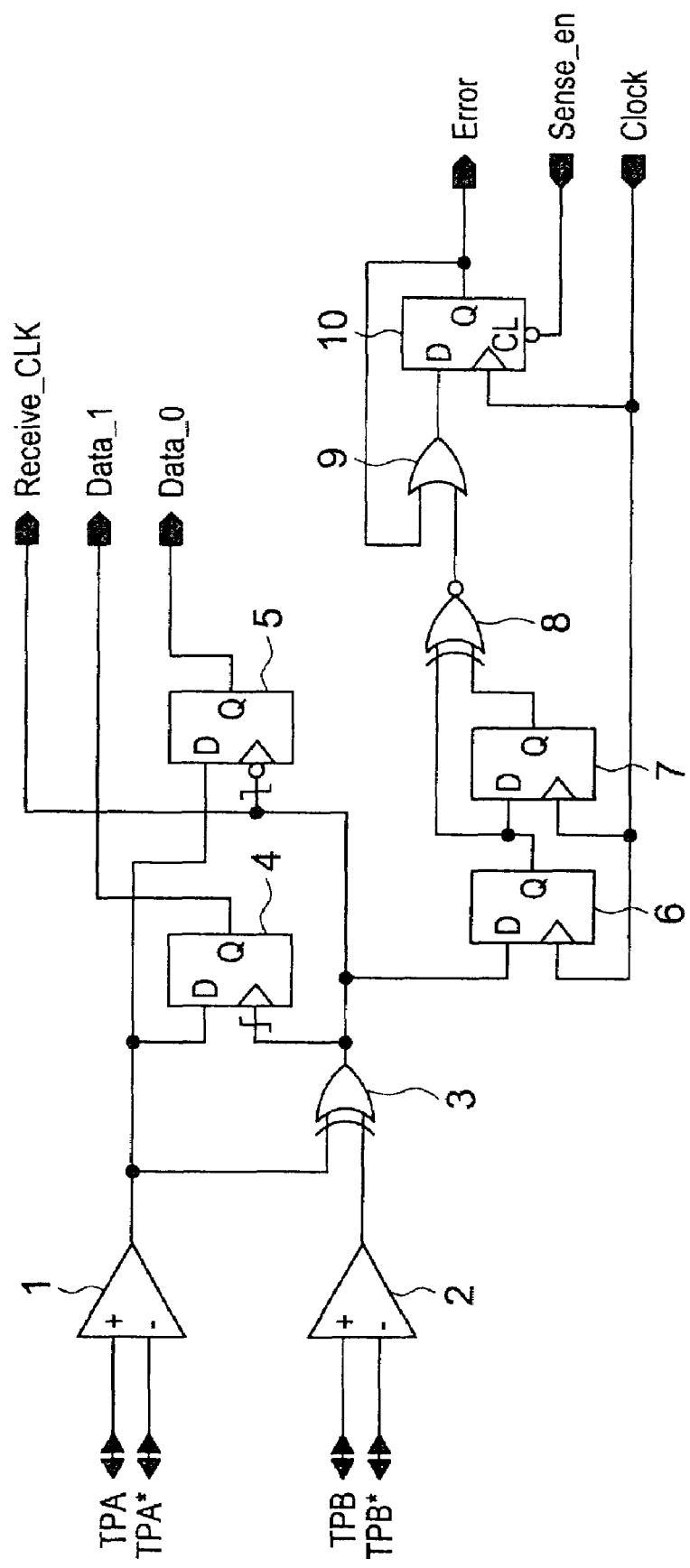
FIG. 4 is a circuit diagram for showing a first embodiment.

FIG. 4 is a circuit diagram for showing the first embodiment of the present invention.

TPA/TPA* twisted-pair signal input terminals are connected to a + (plus) terminal and a − (minus) terminal of a data receiver 1 respectively. TPB/TPB* twisted-pair signal input terminals, on the other hand, are connected to a + terminal and a − terminal of a strobe signal receiver 2 respectively.

The data receiver 1 and the strobe signal receiver 2 are both a circuit which outputs the HIGH level if a voltage of a signal input at the + terminal thereof is higher than that of a signal input at the − terminal thereof and, otherwise, outputs the LOW level. An output of the data receiver 1 is connected to one input of a two-inputs exclusive-OR gate 3 and that of the strobe signal receiver, to the other input thereof. Also, an output of the data receiver 1 is connected to both a terminal D of a flip-flop 4 and a terminal D of a flip-flop 5. A terminal Q of the flip-flop 4 and that of the flip-flop 5 are connected to a data_1 output terminal and a data_0 output terminal respectively, to provide received data. An output of the two-inputs exclusive-OR gate 3 is connected to a clock terminal of the flip-flop 4 and that of the flip-flop 5 and also to a terminal D of a flip-flop 6. It is connected also to a Receive_CLK output terminal to provide a reception clock pulse. Generally, said received data (data_0, data_1) is taken into a shift register or an FIFO for data processing in a higher-order block on the basis of said reception clock pulse (Receive_CLK). These data receiver 1, strobe signal receiver 2, and two-inputs exclusive-OR gate 3 have the same configuration as that of said data/strobe-signal decoding circuit.

Further, a terminal Q of the flip-flop 6 is input to a terminal D of a flip-flop 7 and one input of a two-inputs exclusive-NOR gate 8, while a terminal Q of the flip-flop 7 is input to the other input of the two-inputs exclusive-NOR gate 8. An output of the two-inputs exclusive-NOR gate 8 is connected to one input of a two-inputs OR gate 9. An output of the two-inputs OR gate 9 is input to a terminal D of a flip-flop 10, a terminal Q of which is in turn input to one input of the two-inputs OR gate 9 and also to an Error output terminal for notifying of a difference in data transfer rate. A Sense_en input terminal is connected to a CL (clear) terminal of the flip-flop 10, to provide control over whether a data transfer rate is to be decided. A Clock signal input terminal is connected to the clock signal terminals of the flip-flops 6, 7, and 10. At the Clock signal input terminal is input a clock pulse, a frequency of which is given on the basis of a data transfer rate decided by arbitration performed before transmission/reception of a data packet.

(Operations)

As mentioned above, the IEEE 1394 Standard provides a plurality of data transfer rates of 100 Mbps, 200 Mbps, 400 Mbps, etc., of which a data transfer rate of 200 Mbps is exemplified in the invention.

Figure 5:
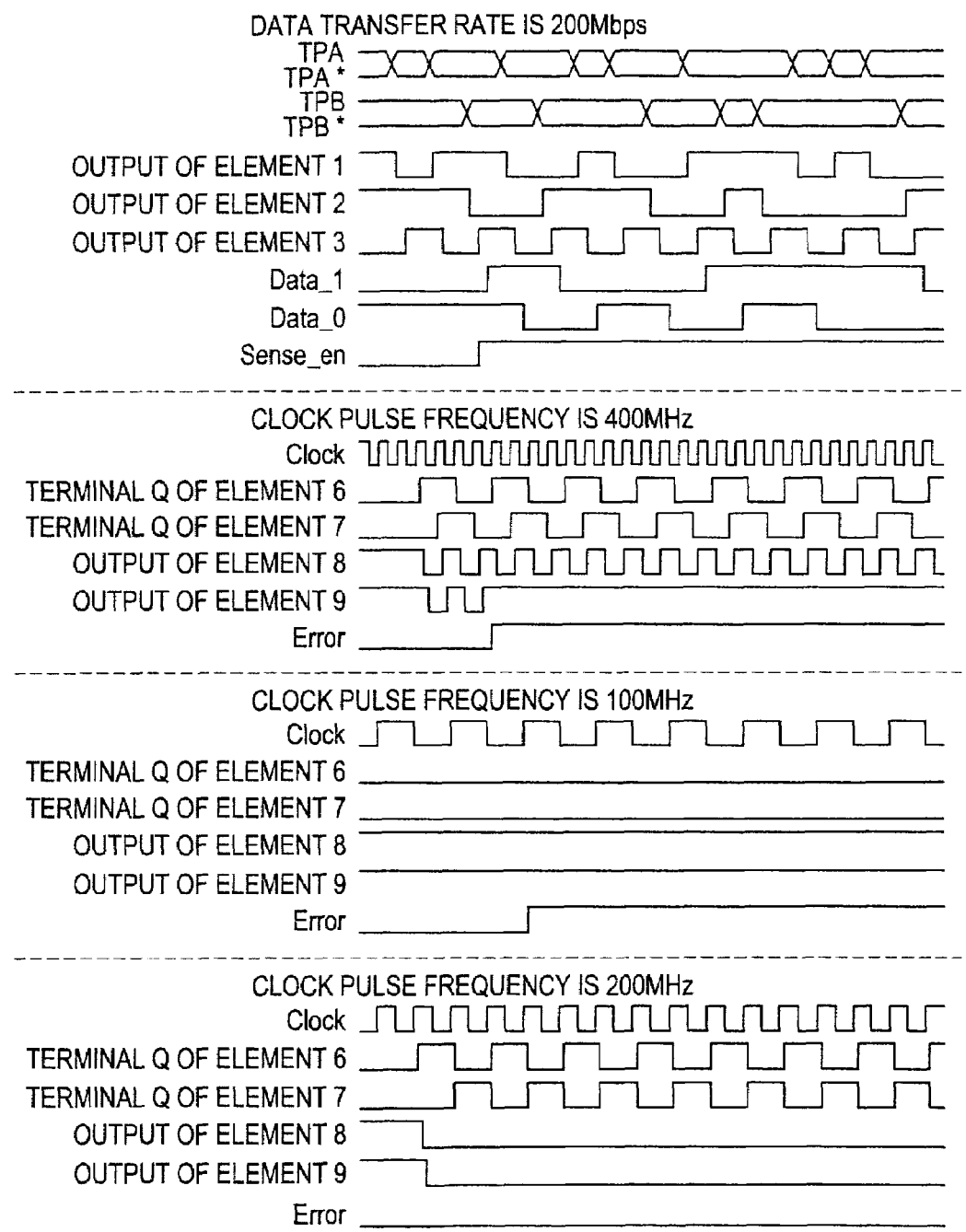
FIG. 5 is a timing chart for showing operations of the first embodiment.

FIG. 5 is a timing chart for showing operations of the first embodiment. The description is made with reference to this timing chart as follows.

When the twisted-pair signals TPA and TPA* are input to its input terminals, the data receiver 1 outputs the HIGH level if a voltage of the signal input at the + terminal thereof is higher than that of the signal input at the – terminal thereof and, otherwise, outputs the LOW level. Likewise, when the twisted-pair signals TPB and TPB* are input to its input terminals, the strobe signal receiver 2 outputs the HIGH level if a voltage of the signal input at the + terminal thereof is higher than that of the signal input at the – terminal thereof and, otherwise, outputs the LOW level.

Subsequently, according to the IEEE1394 Standard, the two-inputs exclusive-OR gate 3 determines an exclusive-OR of an output signal of the data receiver 1 and an output signal of the strobe signal receiver 2 to provide an output signal, at a leading edge of which the flip-flop 4 takes in the output signal of the data receiver 1 to provide its output to the data_1 output terminal. Likewise, at the trailing edge of the output signal of the exclusive-OR two-inputs OR gate 3 the flip-flop 5 takes in the output signal of the data receiver 1 to provide its output to the data_0 output terminal. The output signal of the two-inputs exclusive-OR gate 3 is output to the Receive_CLK output terminal to provide a clock pulse to a shift register or an FIFO which takes in data again for data processing in a higher-order block not shown.

Also, as mentioned above, the data transfer rate is notified of at the time of arbitration performed before transmission/reception of a data packet, so that a clock pulse having a frequency based this data transfer rate is input at the Clock signal input terminal.

In FIG. 5, the timing charts of the cases of the frequencies of the clock pulse input through the Clock signal input terminal being 400 MHz, 100 MHz, and 200 MHz given in this descending order are separated from each other by a broken line, the operations of each of which will be described below.

First, the case where the frequency of said clock pulse is 400 MHz, higher than the data transfer rate is described as follows.

When a clock pulse is input at the Clock signal input terminal, at its leading edge the flip-flop 6 takes in the output signal of the two-inputs exclusive-OR gate 3 to provide a LOW level output, which is in turn taken in by the flip-flop 7 to provide a LOW level output. Then, at the next leading edge of the clock pulse when the two-inputs exclusive-OR gate 3 outputs the HIGH level signal, similarly the flip-flop 6 takes in the output signal of the two-inputs exclusive-OR gate 3 to provide a HIGH level output, which is in turn taken in by the flip-flop 7 to provides a LOW level output.

Therefore, the output signal of the two-inputs exclusive-NOR gate 8 changes from HIGH to LOW in level, thus causing the output signal of the two-inputs OR gate 9 to change from HIGH to LOW in level. At the next leading edge of the clock pulse, similarly the flip-flop 6 takes in the output signal of the two-inputs exclusive-OR gate 3 to provide a HIGH level output, which is in turn taken in by the flip-flop 7 to provide a HIGH level output. Therefore, the output signal of the two-inputs exclusive-NOR gate 8 changes from LOW to HIGH in level, thereby causing the output signal of the two-inputs OR gate 9 to change from LOW to HIGH in level. Subsequently, each time the clock pulse rises in level, the output signal of the two-inputs exclusive-NOR gate 8 is inverted, which can be easily understood by watching the circuit diagram of FIG. 4. Next, when a HIGH level is input through the Sense_en input terminal, the flip-flop 10 can take in the output signal of the two-inputs OR gate 9.

When the clock pulse rises in level with the output signal of the two-inputs OR gate 9 held at the HIGH level, the flip-flop 10 takes in the output signal of the two-inputs OR gate 9 to provide a HIGH level output. When the flip-flop 10 thus provides the HIGH level, the output signal of the two-inputs OR gate 9 is fixed at the HIGH level. Also, the flip-flop 10 provides its output to the Error output terminal. In such a way, the Error output terminal becomes HIGH in level, thus making it possible to notify as Error that a transfer rate of data actually transferred from a transmission side differs from a data transfer rate decided by a reception side at the time of arbitration. Although the above has described a case where a Sense_en signal can be input from a higher-order block to deactivate error notification of non-coincidence of the data transfer rate to the Error output terminal at the time of arbitration or idling, the invention is not limited by whether error notification is possible or not at the time of arbitration or idling but just needs provision of error notification means. Also, although the above has described a case where the information of error notification, if any, is held as it is, the invention is not limited by the method of holding error notification but just needs to have error notification means similarly.

Next, such a case is described as follows that the clock pulse frequency is 100 MHz, lower than the data transfer rate. Like in the case of the clock pulse frequency being 400 MHz, at the leading edge of the clock pulse, the flip-flop 6 takes in an output signal of the two-inputs exclusive-OR gate 3 to provide a LOW level output signal, which is in turn taken in by the flip-flop 7 to provide a LOW level output. Since the flip-flops 6 and 7 both place the LOW level output signal, the two-inputs exclusive-NOR gate 8 and the two-inputs OR gate 9 both provide a HIGH level output signal. Subsequently, the flip-flops 6 and 7 and the two-inputs exclusive-NOR gate 8 are left unchanged in level of the output signal, which can be easily understood by watching the circuit diagram of FIG. 4.

When, a HIGH level signal is input through the Sense_en input terminal, the flip-flop 10 can take in the output signal of the two-inputs OR gate 9, so that at the next leading edge of the clock pulse, the flip-flop 10 takes in the output signal of the two-inputs OR gate 9 to then provide a HIGH level signal to the Error output terminal. Also, the output signal of the two-inputs OR gate 9 is fixed at the HIGH level in output. With this, it is possible to notify as an error that a data transfer rate of data actually transferred from the transmission side differs from a data transfer rate decided by the reception side at the time of arbitration.

Next, such a case is described as follows that said clock pulse frequency is 200 MHz, the same as the data transfer rate. Like in the case above, at the leading edge of the clock pulse, the flip-flop 6 takes in an output signal of the two-inputs exclusive-OR gate 3 to provide a LOW level output, which is in turn taken in by the flip-flop 7 to provide a LOW level output. At the next leading edge of the clock pulse, the flip-flop 6 similarly takes in the output signal of the two-inputs exclusive-OR gate 3 to provide a HIGH level output, which is in turn taken in by the flip-flop 7 to provide a LOW level output. With this, the output signal of the two-inputs exclusive-NOR gate 8 changes from HIGH to LOW in level, thus causing the output signal of the two-inputs OR gate 9 also to change from HIGH to LOW in level. Subsequently, each time the clock pulse rises in level, the flip-flop 6 takes in the output signal of the two-inputs exclusive-OR gate 3 to invert its output signal in level with the output signal of the two-inputs exclusive-NOR gate 8 as left unchanged, which can be easily understood by watching the circuit diagram of FIG. 4. When a HIGH level signal is input through the Sense_en input terminal, the flip-flop 10 can take in the output signal of the two-input OR gate 9, so that at the next leading edge of the clock pulse, the flip-flop 10 takes in the output signal of the two-inputs OR gate 9 to then provide a LOW level signal to the two-inputs OR gate 9 and the Error output terminal. When the clock pulse frequency is the same value of 200 MHz as that of the data transfer rate, no error is notified of, thus confirming that the transfer rate of the data actually transferred from the transmission side is the same as the data transfer rate decided by the reception side at the time of arbitration.

(Effects of First Embodiment)

As mentioned above, by the first embodiment of the invention, it is possible to, upon reception of a data packet, decide whether a data transfer rate decided by the reception side at the time of arbitration is the same as that of data actually transferred by the transmission side.

Second Embodiment

By the first embodiment of the invention, even after non-coincidence between a transfer rate of data actually transferred from a transmission side and a data transfer rate decided by a reception side at the time of arbitration is posted as an error, the clock pulse continues to be supplied to the flip-flops 6, 7, and 10, thus preventing a current dissipation from being suppressed.

Figure 6:
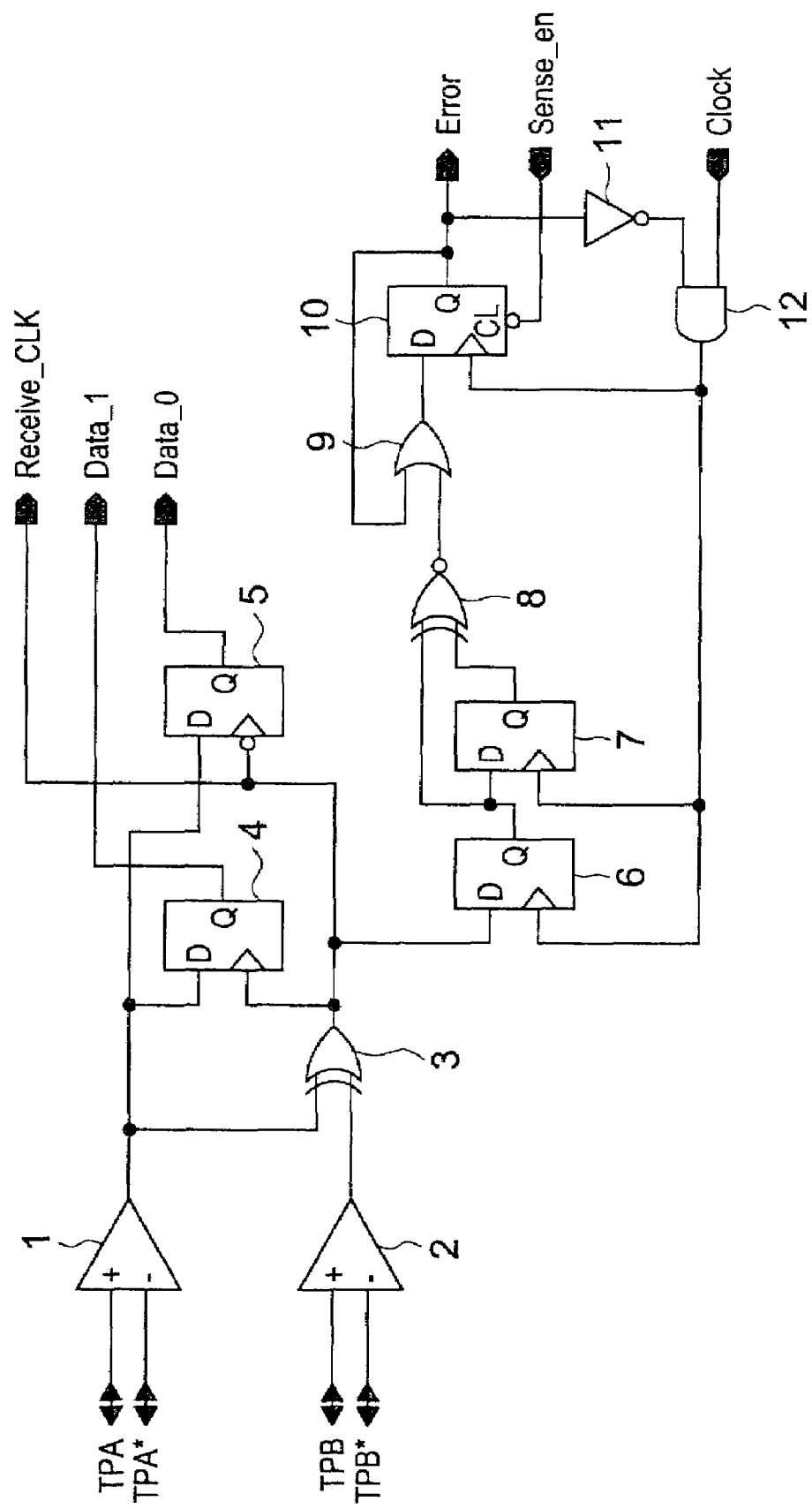
FIG. 6 is a circuit diagram for showing a second embodiment.

FIG. 6 is a circuit diagram for showing the second embodiment. By the second embodiment of the invention, the terminal Q of the flip-flop 10 is connected also to an input of an inverter gate 11. An input of a two-inputs AND gate 12 is connected to an output of the inverter gate 11 and the Clock signal input terminal. Also, the clock terminals of the flip-flops 6, 7, and 10 are connected with an output of the two-inputs AND gate 12.

This configuration makes it possible to stop supply of the clock pulse to said flip-flops 6, 7, and 10 upon error notification.

(Operations)

Figure 7:
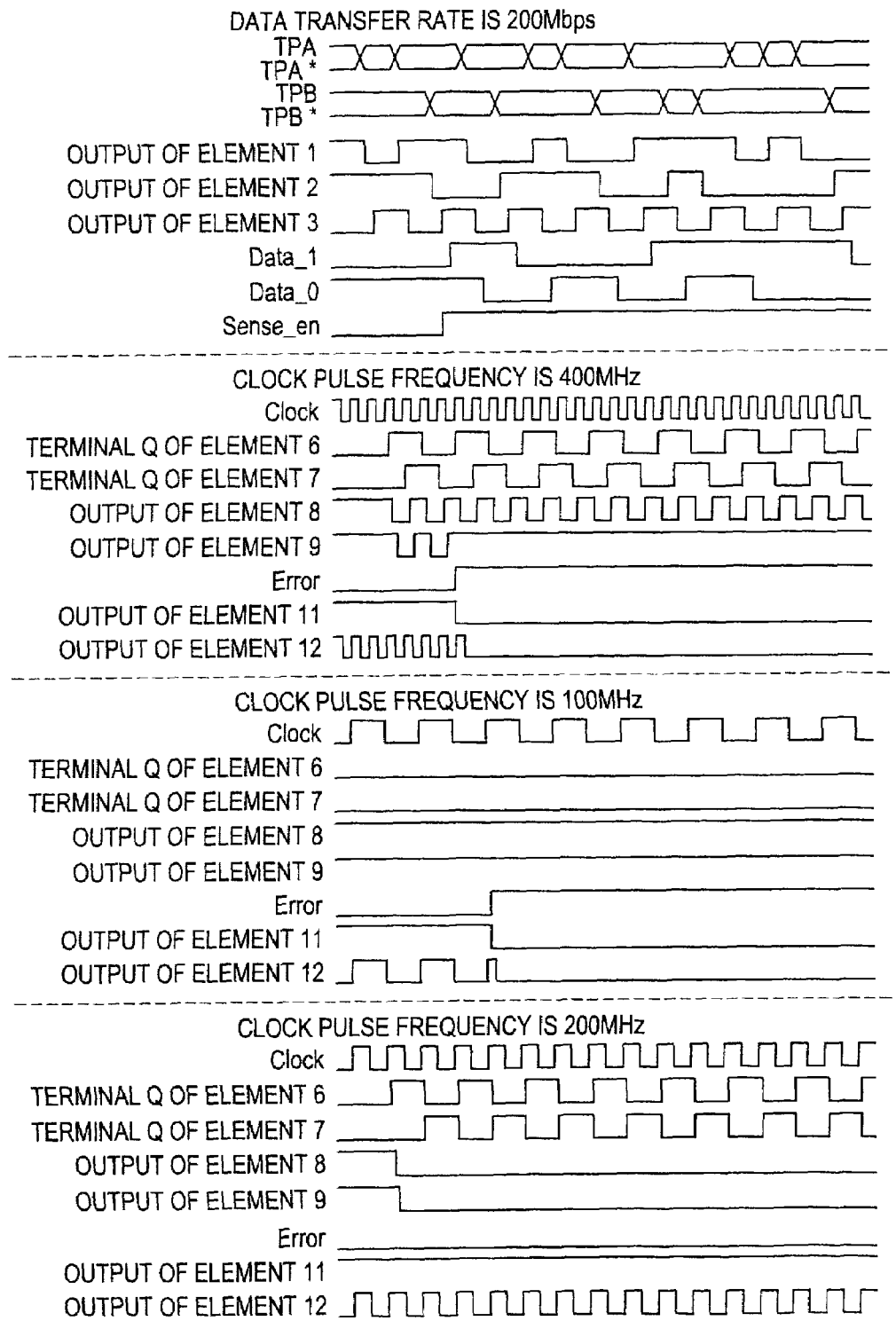
FIG. 7 is a timing chart for showing operations of the second embodiment.

FIG. 7 is a timing chart for showing operations of the second embodiment. This embodiment will be also described on the assumption that the data transfer rate is 200 Mbps. In FIG. 7 also, the timing charts of the cases of the frequencies of the clock pulse input through the Clock signal input terminal being 400 MHz, 100 MHz, and 200 MHz given in this descending order are separated from each other by a broken line, the operations of each of which will be described below.

The cases where said clock pulse frequency is 400 MHz and 100 MHz are the same as those of the first embodiment up to a step where the Error output terminal becomes HIGH in level. Therefore, they are the same as those indicated by the timing charts of FIG. 5 and their description is omitted. When the Error output terminal becomes HIGH in level, the inverter gate 11 provides an output signal of the LOW level, to cause the two-inputs AND gate 12 to be fixed at the LOW level. This stops supply of the clock pulse to the flip-flops 6, 7, and 10.

Next, in the case where said clock pulse frequency is the same value of 200 MHz as the data transfer rate, in which case, as described with the first embodiment of the invention, no error is notified with the Error output terminal as held at the LOW level, so that the output signal of the inverter gate 11 stays at the HIGH level, thus causing a signal from the Clock input terminal to be output as it is as the output signal of the two-inputs AND gate 12.

(Effects of Second Embodiment)

As mentioned above, the second embodiment gives not only the same effect as that by the first embodiment of being able to deciding, upon reception of a data packet, whether a data transfer rate decided by a reception side at the time of arbitration is the same as a data transfer rate of data actually transferred by a transmission side but also goes it give an effect of suppressing the current dissipation because a circuit for deciding the data transfer rate can be stopped in operation if the data transfer rate of data actually transferred from the transmission side differs from that decided by the reception side at the time of arbitration.

Third Embodiment

In the configuration of the invention that if a data transfer rate of data actually transferred from a transmission side is equal to that decided by a reception side at the time of arbitration, as mentioned above, upon reception of a data packet the output signal of the flip-flop 6 is inverted in level each time the clock pulse rises, by the first embodiment of the invention, once the flip-flop 6 takes in an error signal, error notification is performed even when a data transfer rate of data actually transferred from a transmission side is equal to that decided by a reception side at the time of arbitration.

The reasons for taking in the error signal may be as follows:

(1) The transmission and reception sides are not synchronized with the same clock pulse in transmission and reception of data respectively but have their own independent clock pulse generating means, so that they may possibly have a slight difference in the clock pulse frequency.; and (2) A shift in timing may occur between the two pairs of the twisted-pair signals owing to, for example, a jitter or signal quality deterioration due to noise by an external disturbance in the cable.

Figure 8:
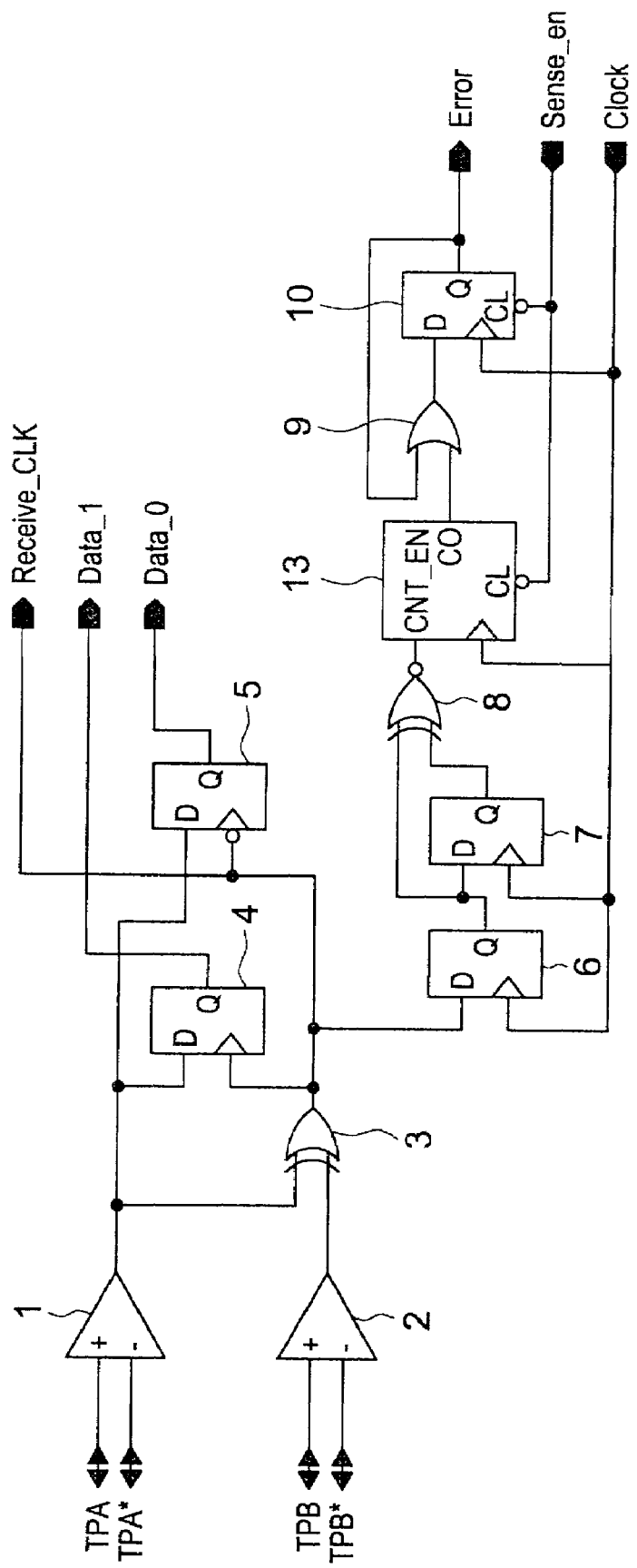
FIG. 8 is a circuit diagram for showing a third embodiment.

FIG. 8 is a circuit diagram for showing the third embodiment.

In a configuration according to the third embodiment of the invention, at the leading edge of the clock pulse, a counter 13 counts the number of times the two-inputs exclusive-NOR gate 8 becomes HIGH in level and, if its count exceeds a prescribed value, performs error notification.

An output of the two-inputs exclusive-NOR gate 8 is connected to a CNT_EN terminal of the counter 13. The CO terminal of the counter 13 is connected to one input of the two-inputs OR gate 9. The clock terminal of the counter 13 is connected to the Clock signal input terminal. In this configuration, the counter 13 counts up each time the signal input at the clock terminal rises with the signal input at the CNT_EN terminal held at the HIGH level and, if it counts full, provides the HIGH level at its terminal CO.

Note here that the invention is not limited to this configuration of the counter 13 but only needs to have a function of counting the number of times the output signal of the two-inputs NOR gate 8 becomes HIGH in level.

(Operations)

Figure 9:
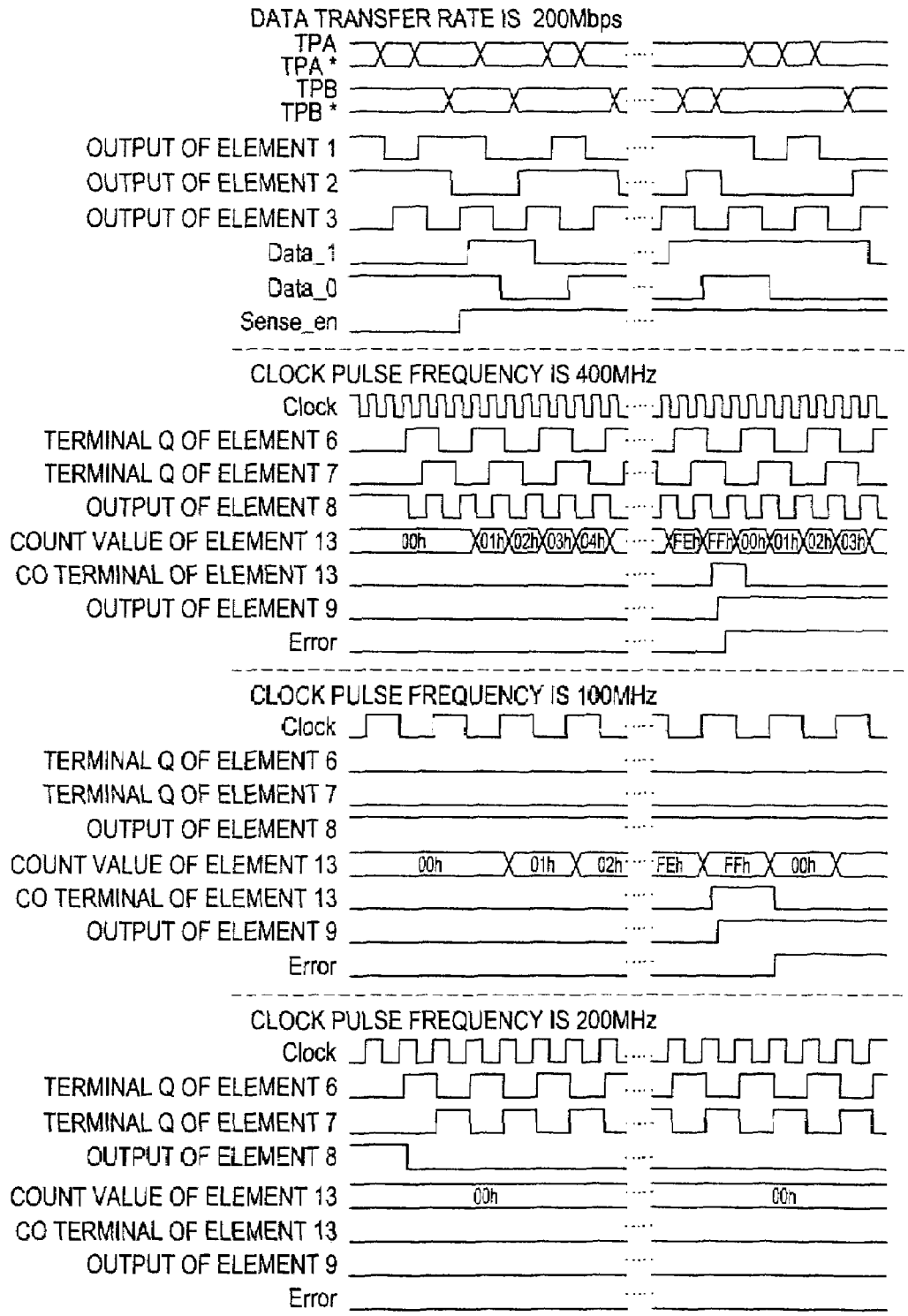
FIG. 9 is a timing chart for showing operations of the third embodiment.

FIG. 9 is a timing chart for showing operations of the third embodiment. This embodiment is also described on the assumption that the data transfer rate is 200 Mbps. In FIG. 9 also, the timing charts of the cases of the frequencies of the clock pulse input through the Clock signal input terminal being 400 MHz, 100 MHz, and 200 MHz given in this descending order are separated from each other by a broken line, the operations of each of which are described below. For the operations of the step where the TPA/TPA* and TPB/TPB* twisted-pair signals are input at the respective input terminals through the step where the data receiver 1, the strobe-signal receiver 2, the two-inputs OR gate 3, and the flip-flops 4 and 5 start to operate, see the description of the first embodiment of the invention.

First, a case is described where clock pulse frequency is 400 MHz, higher than the data transfer rate. When a clock pulse is input from the Clock signal input terminal, at the leading edge of the clock pulse, the flip-flop 6 takes in an output signal of the two-inputs exclusive-OR gate 3 to provide a LOW level output signal, which is in turn taken in by the flip-flop 7 to provide a LOW level output. Next, at the leading edge of the next clock pulse when the output signal of the two-inputs exclusive-OR gate 3 becomes HIGH in level, the flip-flop 6 similarly takes in the output signal of the two-inputs exclusive-OR gate 3 to provide a HIGH level output, which is in turn taken in by the flip-flop 7 to provide a LOW level output. With this, the output signal of the two-inputs exclusive NOR gate 8 changes from HIGH to LOW in level, thus causing the output signal of the two-inputs OR gate 9 also to change from HIGH to LOW in level.

At the leading edge of the next clock pulse, the flip-flop 6 similarly takes in the output signal of the two-inputs exclusive-OR gate 3 to provide a HIGH level output, which is in turn taken in by the flip-flop 7 to provide a HIGH level output. With this, the output signal of the two-inputs exclusive NOR gate 8 changes from LOW to HIGH in level, thus causing the output signal of the two-inputs OR gate 9 also to change from LOW to HIGH in level. Subsequently, each time the clock pulse rises in level, the output signal of the two-inputs exclusive-NOR gate 8 is inverted, which may be easily understood from the circuit diagram of FIG. 8.

Next, when a HIGH level signal is input from the Sense_en input terminal, the counter 13 can count and also the flip-flop 10 can take in the output signal of the two-inputs OR gate 9. Note here that the invention is described with reference to a case where a four-bit counter is used as the counter 13.

Each time the clock pulse rises in level with the output signal of the two-inputs exclusive-NOR gate 8 held at the HIGH level, the counter 13 counts up by one. The clock pulse rises again with the output signal of the two-inputs exclusive-NOR gate 8 held at the HIGH level when the counter 13 has a count value of FEh, the counter 13 counts full and provides a HIGH level output at the terminal CO, thus causing the output signal of the two-inputs OR gate 9 to become HIGH in level. If the clock pulse rises in this state, the flip-flop 10 takes in the output signal of the two-inputs OR gate 9 to provide a HIGH level output. This causes the output signal of the two-inputs OR gate 9 to be fixed at the HIGH level. Also, the flip-flop 10 provides this output to the Error output terminal. The Error output terminal thus becomes HIGH in level, thus making it possible to notify as an error that a data transfer rate of data actually transferred from the transmission side differs from a data transfer rate decided by the reception side at the time of arbitration.

Next, such a case is described as follows that the clock pulse frequency is 100 MHz, lower than the data transfer rate. Like in the case of the clock pulse frequency being 400 MHz, at the leading edge of the clock pulse, the flip-flop 6 takes in an output signal of the two-inputs exclusive-OR gate 3 to provide a LOW level output signal, which is in turn taken in by the flip-flop 7 to provide a LOW level output. Since the flip-flops 6 and 7 both place the LOW level output signal, the two-inputs exclusive-NOR gate 8 provides a HIGH level output signal. Subsequently, the flip-flops 6 and 7 and the two-inputs exclusive-NOR gate 8 are left unchanged in level of the output signal, which can be easily understood by watching the circuit diagram of FIG. 8.

When a HIGH level signal is input through the Sense_en input terminal, the counter 13 can count and also the flip-flop 10 can take in the output signal of the two-inputs OR gate 9. Since the two-inputs exclusive NOR gate 8 places the HIGH level output signal, each time the clock pulse rises in level, the counter 13 counts up by one. If the clock pulse rises in level again with the counter 13 having a count value of FEh, the counter 13 counts full and so provides a HIGH level output at the terminal CO, thus causing the output signal of the two-inputs OR gate 9 to become HIGH in level. If the clock pulse rises in level in this state, the flip-flop 10 can take in the output signal of the two-inputs OR gate 9. This causes the output signal of the two-inputs OR gate 9 to be fixed at the HIGH level and also causes the flip-flop 10 to provide its output to the Error output terminal. The Error output terminal becomes HIGH in level, thus making it possible to notify as an error that a data transfer rate of data actually transferred from the transmission side differs from a data transfer rate decided by the reception side at the time of arbitration.

Next, such a case is described as follows that said clock pulse frequency is 200 MHz, the same as the data transfer rate. Like in the case above, at the leading edge of the clock pulse, the flip-flop 6 takes in an output signal of the two-inputs exclusive-OR gate 3 to provide a LOW level output, which is in turn taken in by the flip-flop 7 to provide a LOW level output. At the next leading edge of the clock pulse, the flip-flop 6 similarly takes in the output signal of the two-inputs exclusive-OR gate 3 to provide a HIGH level output, which is in turn taken in by the flip-flop 7 to provide a LOW level output. With this, the output signal of the two-inputs exclusive-NOR gate 8 changes from HIGH to LOW in level. Subsequently, each time the clock pulse rises in level, the flip-flop 6 takes in the output signal of the two-inputs exclusive-OR gate 3 to invert its output signal in level, which output signal is in turn taken in at each rise of the clock pulse by the flip-flop 7 to invert its output signal in level, with the output signal of the two-inputs exclusive-NOR gate 8 as left unchanged, which can be easily understood by watching the circuit diagram of FIG. 8.

Although the counter 13 can count and also the flip-flop 10 can take in the output signal of the two-inputs OR gate 9 when a HIGH level signal is input from the Sense_en input terminal, the output signal of the two-inputs exclusive-NOR gate 8 is left unchanged at the LOW level and, therefore, the counter 13 does not count up and its output signal stays also at the LOW level at the terminal CO thereof. Also, the output signal of the two-inputs OR gate 9 stays at the LOW level. With this, therefore, the flip-flop 10 provides the LOW level output to the two-inputs OR gate 9 and the Error output terminal.

Thus, in the case where the clock pulse frequency is the same value of 200 MHz as the data transfer rate, error notification is not performed, so that it is possible to confirm that the data transfer rate of data actually transferred from the transmission side is the same as that decided by the reception side at the time of arbitration.

Also, even in the case where the clock pulse frequency is the same value of 200 MHz as the data transfer rate, a shift in timing occurs between the two pairs of the twisted-pair signals owing to, for example, a jitter or deterioration in signal quality, so that once the clock pulse rises in level with the output signal of the two-inputs exclusive-NOR gate 8 as held at the HIGH level, error notification is performed according to the first embodiment of the invention, while according to the third embodiment of the invention, on the other hand, it is possible to avoid error notification using the counter 13 even if such a case occurs up to a specific number of times.

(Effects of Third Embodiment)

According to the third embodiment of the invention, it is thus possible to decide, upon reception of a data packet, whether a data transfer rate decided by the reception side at the time of arbitration is the same as that of data actually transferred by the transmission side and, if they are not the same as each other, notify of it as an error and also is it possible to avoid, up to a specific number of times, error notification due to error information caused by a shift in timing produced between the two pairs of the twisted-pair signals owing to, for example, a jitter or deterioration in signal quality even if these two transfer rates are the same as each other.

Fourth Embodiment

In said third embodiment of the invention also, as the same first embodiment of the present invention, even after non-coincidence between a transfer rate of data actually transferred from a transmission side and a data transfer rate decided by a reception side at the time of arbitration is posted as an error, the clock pulse continues to be supplied to the flip-flops 6, 7, and 10, thus preventing a current dissipation from being suppressed.

Figure 10:
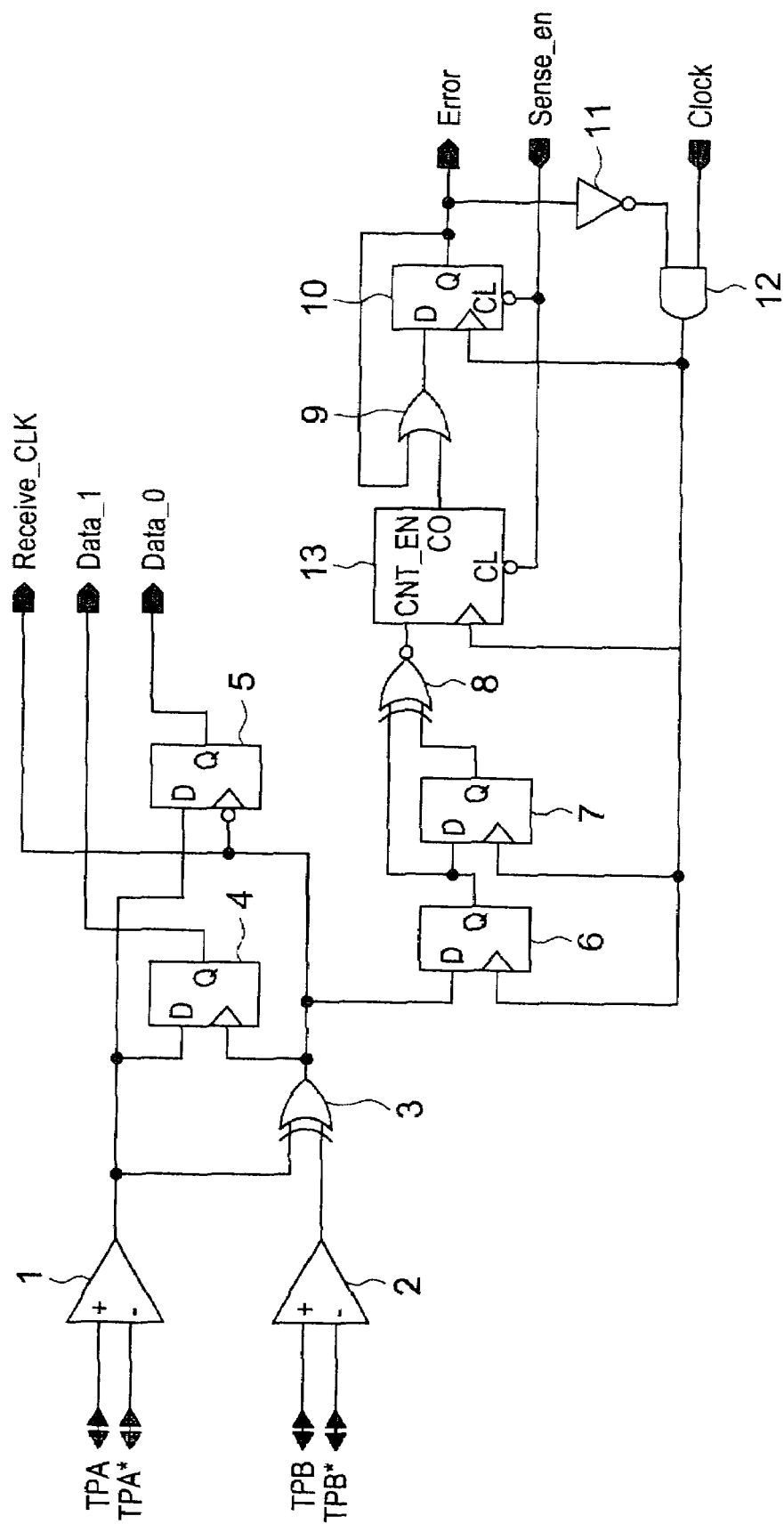
FIG. 10 is a circuit diagram for showing a fourth embodiment.

FIG. 10 is a circuit diagram for showing the fourth embodiment.

By the fourth embodiment of the invention, the terminal Q of the flip-flop 10 is connected also to the input of the inverter gate 11. The input of the two-inputs AND gate 12 is connected to the output of the inverter gate 11 and the Clock signal input terminal. Also, the clock terminals of the flip-flops 6, 7, and 10 and the counter 13 are connected with the output of the two-inputs AND gate 12. This configuration makes it possible to stop supply of the clock pulse to said flip-flops 6, 7, and 10 and the counter 13 upon error notification.

(Operations)

For the operations of a circuit of FIG. 10, the description with the second and third embodiments of the invention may be referenced, so that the following will describe the operations of stopping the supply of the clock pulse using a novel circuit provided in none of the other embodiments. When the Error output terminal becomes HIGH in level, the inverter gate 11 provides a LOW level output signal, while the output signal of the two-inputs AND gate 12 is fixed at the LOW level, thus stopping the supply of the clock pulse to the flip-flops 6, 7, and 10 and the counter 13.

(Effects of Fourth Embodiment)

As mentioned above, the fourth embodiment gives not only the same effect as that by the third embodiment of the invention of being able to decide, upon reception of a data packet, whether a data transfer rate decided by the reception side at the time of arbitration is the same as that of data actually transferred by the transmission side and, if they are not the same as each other, notify of it as an error and also being able to avoid, up to a specific number of times, error notification due to error information caused by a shift in timing produced between the two pairs of the twisted-pair signals owing to, for example, a jitter or deterioration in signal quality even if these two transfer rates are the same as each other but also does it give the same effect as that by the second embodiment of the invention of being able to suppress a current dissipation by stopping the operations of the data transfer rate deciding circuit if it is notified as an error that the transfer rate of data actually transferred by the transmission side differs from that decided by the reception side at the time of arbitration.

Fifth Embodiment

According to the IEEE 1394 Standard, as mentioned above, a data transfer rate is notified of by changing a common mode voltage by pulling in a common mode signaling current at the time of arbitration, which prevents a current dissipation from being suppressed.

Figure 11:
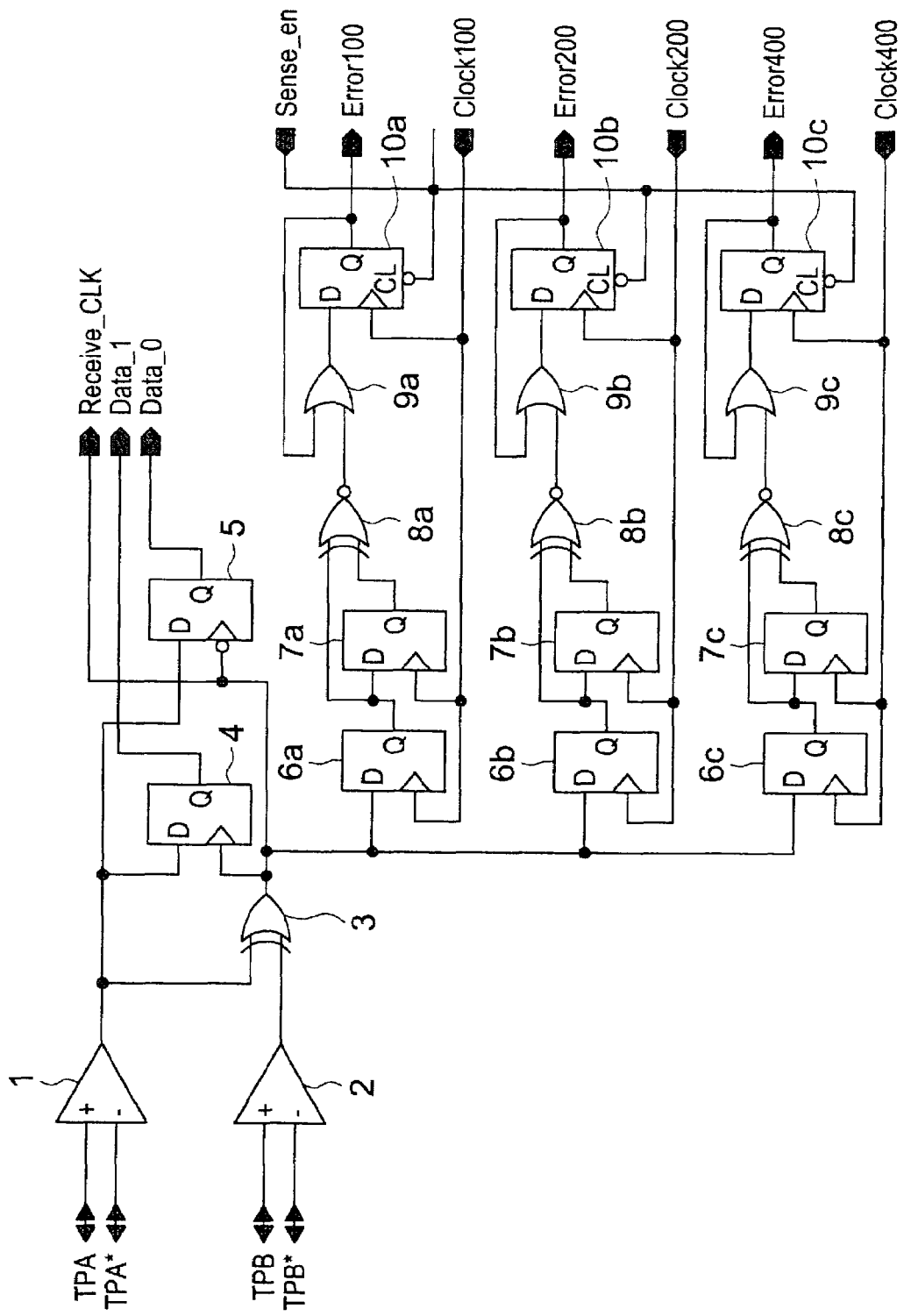
FIG. 11 is a circuit diagram for showing a fifth embodiment.

FIG. 11 is a circuit diagram for showing the fifth embodiment.

The TPA/TPA* twisted-pair signal input terminals are connected to the + terminal and the − terminal of the data receiver 1 respectively, while the TPB/TPB* twisted-pair signal input terminals are connected to the + terminal and the − terminal of the strobe signal receiver 2 respectively. The data receiver 1 and the strobe signal receiver 2 are both a circuit which outputs the HIGH level if a voltage of a signal input at the + terminal thereof is higher than that of a signal input at the − terminal thereof and, otherwise, outputs the LOW level. The output of the data receiver 1 is connected to one input of the two-inputs exclusive-OR gate 3 and that of the strobe signal receiver, to the other input thereof. Also, the output of the data receiver 1 is connected to both the terminal D of the flip-flop 4 and the terminal D of the flip-flop 5. The terminal Q of the flip-flop 4 and that of the flip-flop 5 are connected to the data_1 output terminal and the data_0 output terminal respectively, to provide received data. The output of the two-inputs exclusive-OR gate 3 is connected to the clock terminals of the flip-flops 4 and 5 and also to terminals D of flip-flop 6a, 6b, and 6c. It is connected also to the Receive_CLK output terminal to provide a reception clock pulse. Generally, said received data (data_0 data_1) is taken into a shift register or an FIFO for data processing in a higher-order block on the basis of said reception clock pulse (Receive_CLK).

The flip-flops 6a, 7a, and 10a, a two-input exclusive-NOR gate 8a, and a two-input OR gate 9a constitute a block for deciding whether the data transfer rate is 100 Mbps. A terminal Q of the flip-flop 6a is connected to a terminal D of the flip-flop 7a and one input of the two-inputs exclusive-NOR gate 8a, while a terminal Q of the flip-flop 7a is connected to the other input of the two-inputs exclusive-NOR gate 8a. An output of the two-inputs NOR gate 8a is connected to one input of the two-inputs OR gate 9a. An output of the two-inputs OR gate 9a is connected to a terminal D of the flip-flop 10a, while a terminal Q of the flip-flop 10a is connected to the other input of the two-inputs OR gate 9a and also to an Error100 output terminal for notification of non-coincidence of the data transfer rate.

A Clock100 signal input terminal is connected to clock terminals of the flip-flop 6a, 7a and 10a to receive an incoming clock pulse with a frequency of 100 MHz.

Also, the flip-flops 6b, 7b, and 10b, a two-inputs exclusive-NOR gate 8b, and a two-inputs OR gate 9b constitute a block for deciding whether the data transfer rate is 200 Mbps. A terminal Q of the flip-flop 6b is connected to a terminal D of the flip-flop 7b and one input of the two-inputs exclusive-NOR gate 8b, while a terminal Q of the flip-flop 7b is connected to the other input of the two-inputs exclusive-NOR gate 8b. An output of the two-inputs exclusive-NOR gate 8b is connected to one input of the two-inputs OR gate 9b. An output of the two-inputs OR gate 9b is connected to a terminal D of the flip-flop 10b, while a terminal Q of the flip-flop 10b is connected to the other input of the two-inputs OR gate 9b and also to an Error200 output terminal for notification of non-coincidence of the data transfer rate. A Clock200 input terminal is connected to the clock terminals of the flip-flops 6b, 7b, and 10b to receive an incoming clock pulse with a frequency of 200 MHz.

Also, the flip-flops 6c, 7c, and 10c, a two-inputs exclusive-NOR gate 8c, and a two-inputs OR gate 9c constitute a block for deciding whether the data transfer rate is 400 Mbps. A terminal Q of the flip-flop 6c is connected to a terminal D of the flip-flop 7c and one input of the two-inputs exclusive-NOR gate 8c, while a terminal Q of the flip-flop 7c is connected to the other input of the two-inputs exclusive-NOR gate 8c. An output of the two-inputs exclusive-NOR gate 8c is connected to one input of the two-inputs OR gate 9c. An output of the two-inputs OR gate 9c is connected to a terminal D of the flip-flop 10c, while a terminal Q of the flip-flop 10c is connected to the other input of the two-inputs OR gate 9c and also to an Error400 output terminal for notification of non-coincidence of the data transfer rate. A Clock400 input terminal is connected to the clock terminals of the flip-flops 6c, 7c, and 10c to receive an incoming clock pulse with a frequency of 400 MHz.

The Sense_en input terminal is connected to the CL clear terminals of the flip-flops 10a, 10b, and 10c, to provide control over whether the data transfer rate is to be decided.

(Operations)

Figure 12:
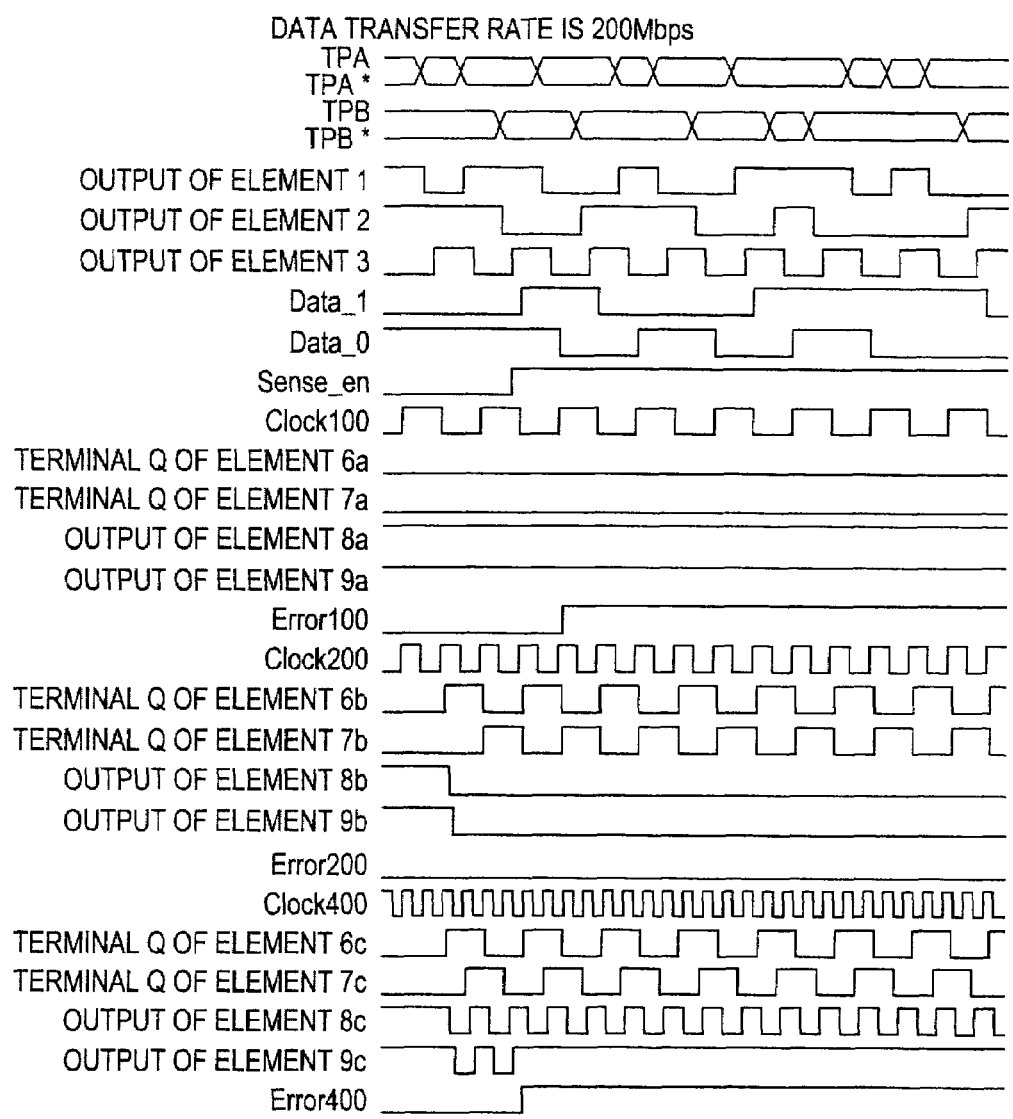
FIG. 12 is a timing chart for showing operations of the fifth embodiment.

FIG. 12 is a timing chart for showing operations of the fifth embodiment. This embodiment is also described on the assumption that the data transfer rate is 200 Mbps. For the operations of the step where the TPA/TPA* and TPB/TPB* twisted-pair signals are input at the respective input terminals through the step where the data receiver 1, the strobe-signal receiver 2, the two-inputs exclusive-OR gate 3, and the flip-flops 4 and 5 start to operate, see the description of the first embodiment of the invention for easy understanding.

First, the following will describe the operations of the block for deciding whether the data transfer rate is 100 Mbps. When a clock pulse is input from the Clock100 signal input terminal, at the leading edge of the 100-MHz clock pulse, the flip-flop 6a takes in an output signal of the two-inputs exclusive-OR gate 3 to provide a LOW level output signal, which is in turn taken in by the flip-flop 7a to provide a LOW level output.

Since the flip-flops 6a and 7a both place the LOW level output signal, the two-inputs exclusive-NOR gate 8a and the two-inputs OR gate 9a both provide a HIGH level output signal. Subsequently, the flip-flops 6a and 7a and the two-inputs exclusive-NOR gate 8a are left unchanged in level of the output signal, which can be easily understood by watching the circuit diagram of FIG. 11.

When, a HIGH level signal is input through the Sense_en input terminal, the flip-flop 10a can take in the output signal of the two-inputs OR gate 9a, so that at the next leading edge of the 100-MHz clock pulse, the flip-flop 10a takes in the output signal of the two-inputs OR gate 9a to then provide a HIGH level signal to the Error100 output terminal. Also, the two-inputs OR gate 9a is fixed at the HIGH level in output. With this, it is possible to notify as an error that a data transfer rate of data actually transferred from the transmission side is not 100 Mbps.

Next, the following will describe the operations of the block for deciding whether the data transfer rate is 200 Mbps. When a 200-MHz clock pulse is input from the Clock200 signal input terminal, at the leading edge of the 200-MHz clock pulse, the flip-flop 6b takes in an output signal of the two-inputs exclusive-OR gate 3 to provide a LOW level output signal, which is in turn taken in by the flip-flop 7b to provide a LOW level output.

At the next leading edge of the 200-MHz clock pulse, the flip-flop 6b similarly takes in the output signal of the two-inputs exclusive-OR gate 3 to provide a HIGH level output, which is in turn taken in by the flip-flop 7b to provide a LOW level output. With this, the output signal of the two-inputs exclusive-NOR gate 8b changes from HIGH to LOW in level, thus causing the output signal of the two-inputs OR gate 9b to change from HIGH to LOW in level. Subsequently, each time the 200-MHz clock pulse rises in level, the flip-flop 6b takes in the output signal of the two-inputs exclusive-OR gate 3 to invert its output signal in level, which output signal is in turn taken in at each rise of the clock pulse by the flip-flop 7b to invert its output signal in level, with the output signal of the two-inputs exclusive-NOR gate 8b as left unchanged, which can be easily understood by watching the circuit diagram of FIG. 11. When, a HIGH level signal is input through the Sense_en input terminal, the flip-flop 10b can take in the output signal of the two-inputs OR gate 9b, so that at the next leading edge of the 200-MHz clock pulse, the flip-flop 10b takes in the output signal of the two-inputs OR gate 9b to then provide a LOW level signal to the Error200 output terminal.

Thus, error notification is not performed, so that it is possible to confirm that the data transfer rate of data transferred from the transmission side is not 200 Mbps.

Next, the following will describe the operations of the block for deciding whether the data transfer rate is 400 Mbps. When a 400-MHz clock pulse is input from the Clock400 signal input terminal, at the leading edge of the 400-MHz clock pulse, the flip-flop 6c takes in an output signal of the two-inputs exclusive-OR gate 3 to provide a LOW level output signal, which is in turn taken in by the flip-flop 7c to provide a LOW level output.

At the next leading edge of the 400-MHz clock pulse when the two-inputs exclusive-OR gate 3 becomes HIGH in level, the flip-flop 6c similarly takes in the output signal of the two-inputs exclusive-OR gate 3 to provide a HIGH level output, which is in turn taken in by the flip-flop 7c to provide a LOW level output. With this, the output signal of the two-inputs exclusive-NOR gate 8c changes from HIGH to LOW in level, thus causing the output signal of the two-inputs OR gate 9c to change from HIGH to LOW in level. At the next leading edge of the 400-MHz clock pulse, the flip-flop 6c similarly takes in the output signal of the two-inputs exclusive-OR gate 3 to provide a HIGH level output, which is in turn taken in by the flip-flop 7c to provide a LOW level output. With this, the output signal of the two-inputs exclusive-NOR gate 8c changes from LOW to HIGH in level, thus causing the output signal of the two-inputs OR gate 9c to change from LOW to HIGH in level. Subsequently, each time the 400-MHz clock pulse rises in level, the output signal of the two-inputs exclusive-NOR gate 8c is inverted in level, which can be easily understood by watching FIG. 12. Next, when a HIGH level signal is input through the Sense_en input terminal, the flip-flop 10c can take in the output signal of the two-inputs OR gate 9c. When the 400-MHz clock pulse rises in level with the output signal of the two-inputs OR gate 9c held at the HIGH level, the flip-flop 10c takes in the output signal of the two-inputs OR gate 9c to provide a HIGH level output. When the flip-flop 10c thus provides the HIGH level, the output signal of the two-inputs OR gate 9c is fixed at the HIGH level. Also, the flip-flop 10c provides its output to the Error output terminal. In such a way, it is possible to notify as error that a transfer rate of data transferred from a transmission side is not 400 Mbps.

(Effects of Fifth Embodiment)

As mentioned above, by the fifth embodiment, it is possible to permit the reception side to decide a data transfer rate of data actually transferred from the transmission side irrespective of whether the data transfer rate is posted in arbitration, so that the transfer rate of data transferred between apparatuses having the same function can be decided without need of pulling in the common mode signaling current at the time of arbitration, thus suppressing a current dissipation.

If the apparatus of the transmission side is not provided with this function, it needs to have a function of pulling the common mode signaling current in order to post a data transfer rate, which function, however, is not disturbed, thus making it possible to connect this apparatus to a conventional one.

Also, since the reception side can decide a data transfer rate of data actually transferred from the transmission side, even if the data transfer rate is decided to be different at the time of arbitration between the transmission side and the reception side, a higher-order block can process the data based on the data transfer rate of the data transferred from the transmission side.

Sixth Embodiment

In said fifth embodiment of the invention, even after an error is posted by all of the block for deciding whether the data transfer rate of data transferred by the transmission side is 100 Mbps, the block for deciding whether the data transfer rate of data transferred by the transmission side is 200 Mbps, the block for deciding whether the data transfer rate of data transferred by the transmission side if 100 Mbps, the block for deciding whether the data transfer rate of data transferred by the transmission side is 400 Mbps, the clock pulses of these frequencies are continue to be supplied, thus preventing the current dissipation from being suppressed.

Figure 13:
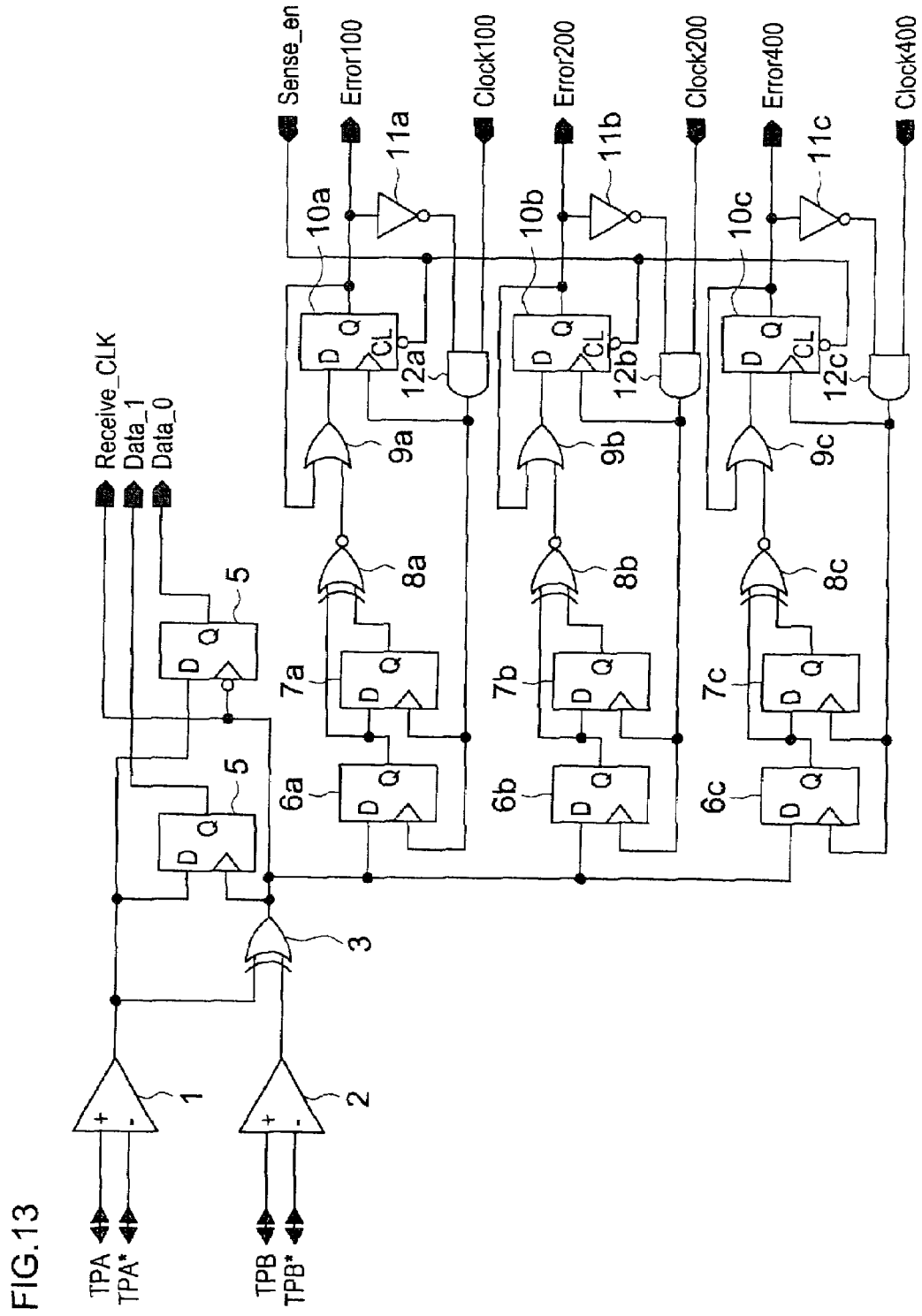
FIG. 13 is a circuit diagram for showing a sixth embodiment.

FIG. 13 is a circuit diagram for showing the sixth embodiment.

By the sixth embodiment of the invention, the terminal Q of the flip-flop $10a$ is connected also to the input of the inverter gate $11a$. The input of the two-inputs AND gate $12a$ is connected to the output of the inverter gate $11a$ and the Clock100 signal input terminal. Also, the clock terminals of the flip-flops $6a$, $7a$, and $10a$ are connected with the output of the two-inputs AND gate $12a$.

Also, the terminal Q of the flip-flop $10b$ is connected also to the input of the inverter gate $11b$. The input of the two-inputs AND gate $12b$ is connected to the output of the inverter gate $11b$ and the Clock200 signal input terminal. Also, the clock terminals of the flip-flops $6b$, $7b$, and $10b$ are connected with the output of the two-inputs AND gate $12b$.

Further also, the terminal Q of the flip-flop $10c$ is connected also to the input of the inverter gate $11c$. The input of the two-inputs AND gate $12c$ is connected to the output of the inverter gate $11c$ and the Clock400 signal input terminal. Also, the clock terminals of the flip-flops $6c$, $7c$, and $10c$ are connected with the output of the two-inputs AND gate $12c$.

As such, upon error notification, the supply of a clock pulse can be stopped to any of the data transfer rate deciding blocks that has posed an error.

(Operations)

Figure 14:
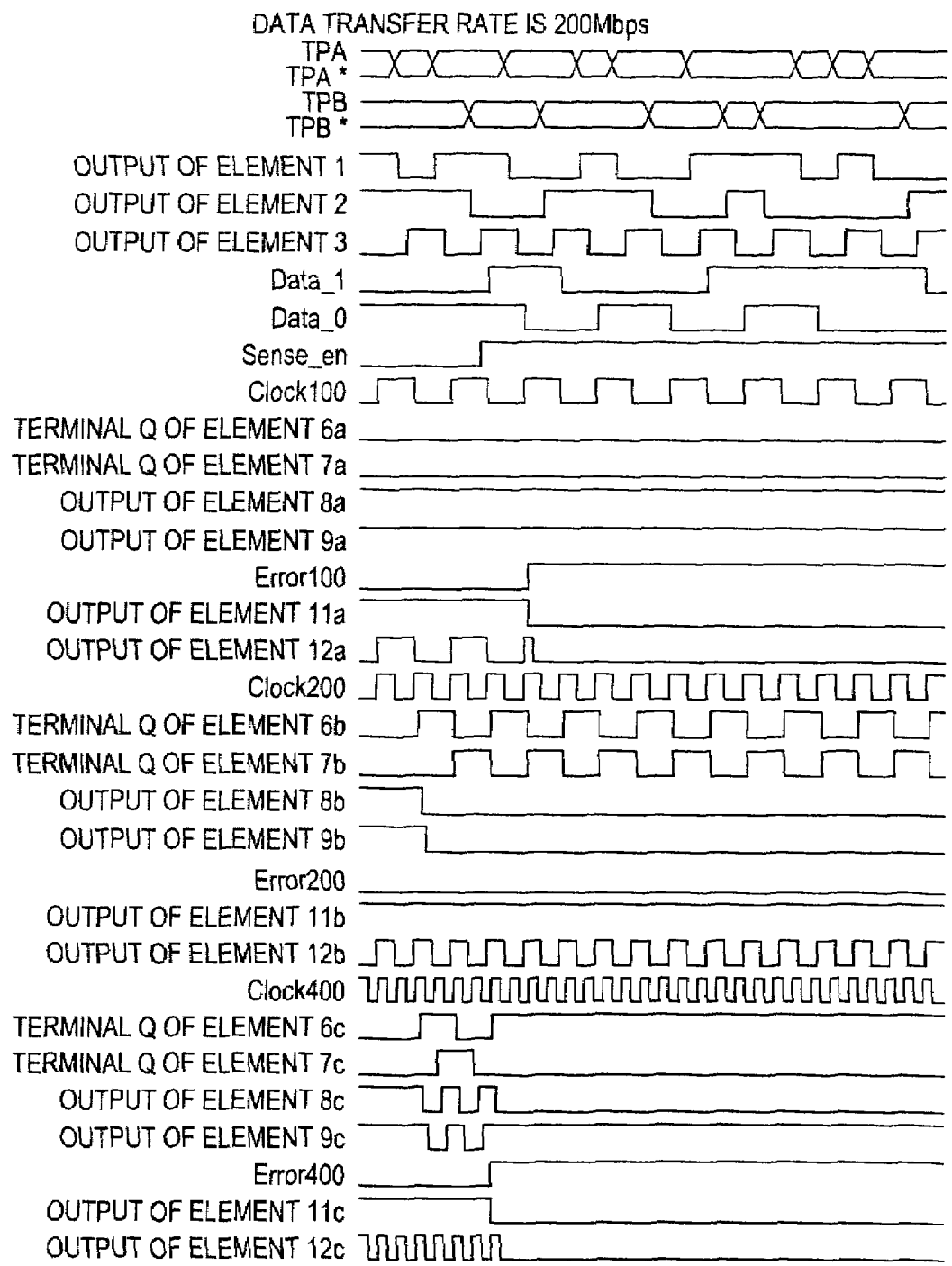
FIG. 14 is a timing chart for showing operations of the sixth embodiment.

FIG. 14 is a timing chart for showing operations of the sixth embodiment. The operations of this circuit are also described on the assumption that the data transfer rate is 200 Mbps.

In the case of the block for deciding whether the data transfer rate is 100 Mbps, for the operations up to the step that the Error100 output terminal becomes HIGH in level, see those of the fifth embodiment of the invention indicated by the timing chart of FIG. 12. When the Error100 output terminal thus becomes HIGH in level, the output signal of the inverter gate $11a$ becomes LOW in level and that of the two-inputs AND gate $12a$ is fixed at the LOW level. With this, the supply of the clock pulse is stopped to the flip-flops $6a$, $7a$, and $10a$.

In the case of the block for deciding whether the data transfer rate is 200 Mbps, as described with the fifth embodiment of the invention, no error is posted and the Error200 output terminal is held at the LOW level, so that the output signal of the inverter gate $11b$ is HIGH in level, thus causing the output signal of the two-inputs AND gate $12b$ to be output as it is from the Clock200 input terminal.

In the case of the block for deciding whether the data transfer rate is 400 Mbps, for the operations up to the step that the Error 400 output terminal becomes HIGH in level, see those of the fifth embodiment of the invention indicated by the timing chart of FIG. 12. When the Error400 output terminal thus becomes HIGH in level, the output signal of the inverter gate $11c$ becomes LOW in level ands that of the two-inputs AND gate $12c$ is fixed at the LOW level. With this, the supply of the clock pulse is stopped to the flip-flops $6c$, $7c$, and $10c$.

(Effects of Sixth Embodiment)

As mentioned above, the sixth embodiment of the invention gives not only the same effect as that by the fifth embodiment of the invention but also such an effect as to stop the operations of the circuit of such a block for deciding a data transfer rate of data transferred from the transmission side as having posted an error, thus similarly suppressing the current dissipation.

Although the above embodiments of the invention have been described with reference to the case where the Sense_en signal can be used to deactivate error notification, the invention is not limited by whether the control function is provided to activate error notification but just needs provision of error notification means. Also, although the above has described the case where the information of error notification, if any, is held as it is, the invention is not limited by the method of holding error notification but just needs to have error notification means similarly.

Although the first to fourth embodiments of the invention have been described only with reference to the case where the frequency of the clock pulse used to decide a data transfer rate of data transmitted from the transmission side is 100 MHz, 200 MHz, and 400 MHz, the invention is not limited by the values of the frequency of the clock pulse input from the Clock signal terminal. The invention can accommodate such possibly expanded future data transfer rate as 800 Mbps, 1.6 Gbps, etc. by changing the clock pulse frequency and also can accommodate an apparatus which supports only 100 Mbps or an apparatus which supports up to 100 Mbps or 200 Mbps.

Although the third and fourth embodiments of the invention have been described with reference to the case where the counter 13 is of a four-bit configuration, the invention is not limited by the configuration of the counter 13. For example, it may be of an eight-bit configuration. Also, the counter 13, if provided with a data loading function, is cable of arbitrarily and easily setting the number of times up to which mistaken information is suppressed before it is actually notified as an error.

Although the fifth and sixth embodiments of the invention have been described to be able to deciding a data transfer rate of data transferred from the transmission side when it is 100 Mbps, 200 Mbps, or 400 Mbps, the invention is not limited by the kinds or the number of the data transfer rates of data transferred from the transmission side. The invention can accommodate such a possibly expanded future data transfer rate as 800 Mbps or 1.6 Gbps only by having an additional block for deciding these data transfer rates of data transferred from the transmission side.

Seventh Embodiment

In arbitration in the above-mentioned embodiments, the TPA and TPB signals are used in twisted-pair operations by use of a twisted-pair cable, carrying three values of information of "0", "1", and "Hi-Z". The TPA and TPB cables each have a driver and a receiver in such a configuration that the TPA cable of a node of itself is connected to the TPB cable of the opposing node and the TPB cable of itself is connected to the TPA cable of the opposing node. According to the IEEE 1394, the receiver monitors the on-the-cable state for an action on the two ends along the two paired cables of TPA and TPB, thus conducting complicated control between the nodes based on a state produced on these two cables of TPA and TPB.

The TPA and TPB signals not only give data and clock signal components carried on the data signal and the strobe signal but also transfer such a state between the nodes as cable attachment/detachment, speed signals, bus resetting, arbitration, etc. based on the three states of "0", "1", and "Hi-Z" carried on said twisted-pair signal and a bias applied on the pair signals of TPA and TPB.

In the above-mentioned embodiments, in a PRIFIX time prior to transmission of a packet, the speed information of this packet is transferred. In the cable environment according to the IEEE 1394, the speed accommodated now includes 98.304 Mbps (S100), 196.608 Mbps (S200), and 393.216 Mbps (S400). To transmit the speed information, it is necessary to flow a bias current between the TPB twisted-pair cables and the GND terminal in a DATA_PRIFIX time. For S200 a current of 3.5 mA is flown, for S400 a current of 10 mA is flown, and for S100 no current is flown. Since a difference in bias current can be detected as a difference in amplitude on the reception side, the speed can be decided on the basis of a state detected by the two speed-information detection converters mounted to the TPA cable of the opposing node.

As almost the same function as the above-mentioned arbitration function, there is available another function of auto-negotiation over the Ethernet (registered trade name). Auto-negotiation refers to such a function as to automatically recognize an operation mode of an apparatus connected in an opposed manner, thus implementing connection in an optimal operation mode common to both parties.

The following will describe such seventh embodiment of the invention as applied to the Ethernet (registered trade name).

This seventh embodiment provides an example where such a circuit is incorporated as to post in the Error signal a difference in data transfer rate indicated in the above-mentioned first embodiment of the invention. The IEEE 1394 differs from the Ethernet (registered trade name) in that the IEEE 1394 uses one pair of communication lines for both transmission and reception, whereas the Ethernet (registered trade name) uses one pair of communication lines for each of transmission and reception.

Figure 15:
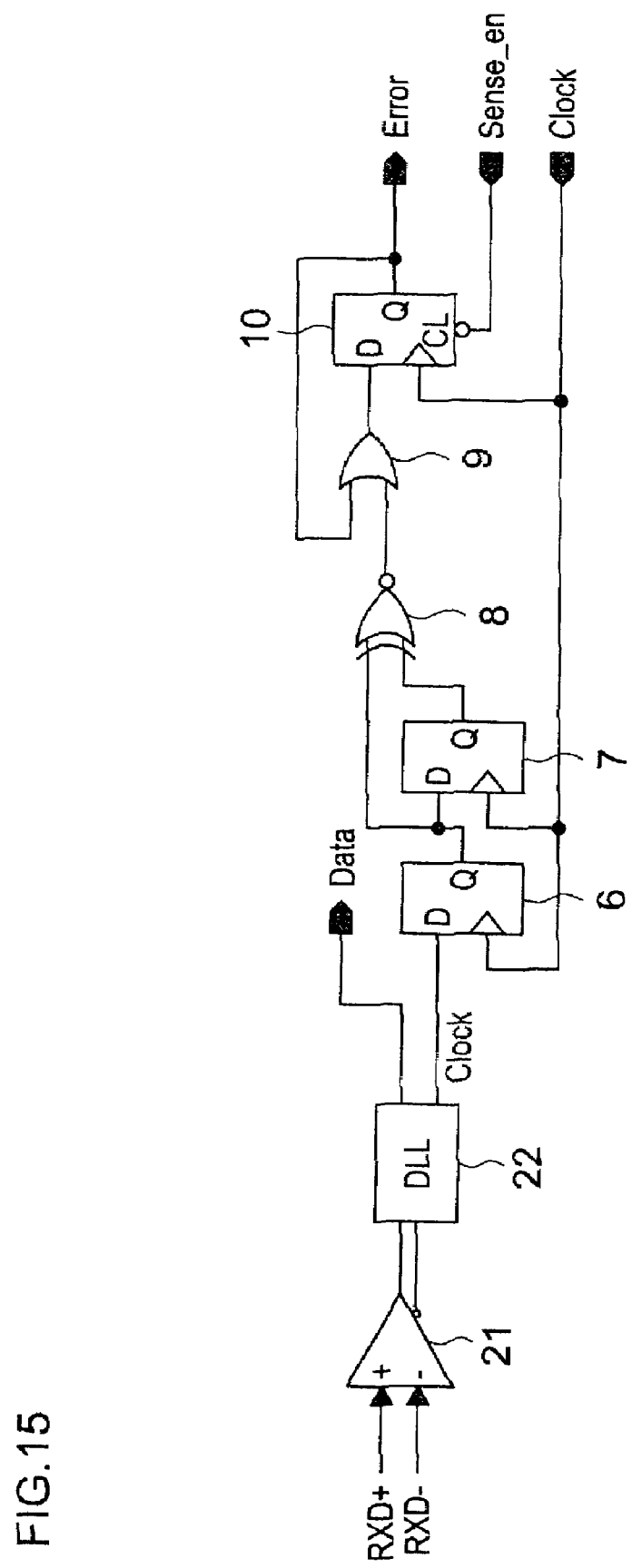
FIG. 15 is a circuit diagram for showing a seventh embodiment.

FIG. 15 is a circuit diagram for showing the seventh embodiment.

RXD+ and RXD− received-data signal input terminals are connected to the + and − terminals of a receiver 21 respectively. An output terminal of the receiver 21 is connected to a DLL (Delay-locked Loop) circuit 22. The DLL circuit 22 is provided with a function to delay the received signal to thereby detect a clock and also has an output terminal at which the data and the clock pulse are output as separated from each other. A Data terminal of the DLL circuit 22 is connected to a data processing circuit not shown. A Clock signal terminal of the DLL circuit 22 is connected to the terminal D of the flip-flop 6.

Such a circuit has the same circuit configuration as that described already in the first embodiment as constituted by the flip-flops 7 and 10, the two-inputs exclusive-NOR gate 8, and the two-inputs OR gate 9 on the downstream side of this flip-flop 6, as receiving an incoming control signal from the Sense_en input terminal and the clock pulse from the Clock signal input terminal, and as outputting an error signal to the Error output terminal.

The IEEE 802.3 Standard applied to the Ethernet (registered trade name) provides a plurality of transfer rates such as 100 Mbps, 10 Mbps, etc.

(Operations)

The following will describe the operations of the seventh embodiment with reference to a case where the frequency of a clock pulse input from the Clock signal input terminal is the same as that of a data transfer rate of the received data signal.

The received-data signals RXD+ and RXD− received by the receiver 21 are divided into a data signal and a clock signal by the DLL circuit 22 to be output as separated from each other. Said clock signal is input to the terminal D of the flip-flop 6. From the Clock signal input terminal, on the other hand, is supplied an input clock pulse having one of said transfer rates, for example, 100 Mbps, which is then input to the clock signal terminals of said flip-flops 6 and 7.

First, when the input clock pulse is applied to the clock signal terminals of both flip-flops 6 and 7, the flip-flop 6 is synchronized with the leading edge of the input clock pulse to thereby take in the HIGH level of the output clock pulse of the DLL circuit 22, to provide a HIGH level output to the two-inputs exclusive-NOR gate 8.

At the next leading edge of the input clock pulse, the flip-flop 6 takes in the LOW level of the output clock pulse of the DLL circuit 22 to thereby provides a LOW level output to the two-inputs exclusive-NOR gate 8, which output is in turn taken in by the flip-flop 7, which provides a HIGH level output to the two-inputs exclusive-NOR gate 8. Subsequently, each time the clock pulse rises in level, the flip-flop 6 takes in the output signal of the DLL circuit 22 to then invert its output signal, which is in turn taken in by the flip-flop 7 at each leading edge of the clock pulse, which then inverts its output signal. As a result, the two-inputs exclusive-NOR gate 8 stays unchanged in the level of its output signal.

The following will describe a case where the frequency of the input clock pulse is different from that of the data transfer rate.

When these two flip-flops 6 and 7 stopped being synchronized with the leading edge of the clock pulse to output the HIGH level alternately, that is, unless these two flip-flops 6 and 7 alternately output pulses having the same waveform at the same frequency with a delay of one input clock pulse therebetween, it can be detected as non-coincidence in transfer rate based on the Error output.

Although FIG. 15 has applied said Error detection circuit shown in FIG. 4, an Error detection circuit of any other embodiments can be applied similarly.

(Effects of Seventh Embodiment)

Thus, according to the seventh embodiment of the invention, it is possible to decide, before reception of data, whether a data transfer rate decided by the reception side before data transfer and that of data actually transferred by the transmission side.

Although the above has described the preferred embodiments of the data transfer rate deciding method and circuit according to the invention with reference to the accompanying drawings, the invention is not limited thereto. Those skilled in the art will clearly anticipate a variety of variants and modifications within a range of technological concepts described in the claims and will understand that of course they are covered by the technological scope of the invention.

The invention has the following effects:

(1) It is possible to decide, upon reception of a data packet, whether a data transfer rate decided by the reception side at the time of such a pre-data transfer procedure as arbitration or negotiation is the same as that of data actually transferred by the transmission side;

(2) It is possible to stop the operations of a circuit for deciding a data transfer rate if it is posted as an error that a data transfer rate of data actually transferred by the transmission side is different from that decided by the transmission side at the time of the pre-data transfer procedure, thus suppressing the current dissipation;

(3) It is possible to avoid, up to a specific number of times, error notification due to error information caused by a shift in timing produced between two pairs of twisted-pair signals owing to, for example, a jitter or deterioration in signal quality even if a data transfer rate decided by the reception side is the same as that of data actually transferred by the transmission side;

(4) If the apparatus of the transmission side is not provided the same function as that of the reception side, it needs to have a function of pulling the common mode signaling current in order to post a data transfer rate, which function, however, is not disturbed, thus making it possible to connect this apparatus to a conventional one. Also, the reception side can decide a data transfer rate of data actually transferred by the transmission side, so that even if the data transfer rate is different in decision between the transmission and reception sides at the pre-data transfer procedure, a higher-order block can process the data based on the data transfer rate of the data transferred from the transmission side;

(5) It is possible to easily know the activation/deactivation of the pre-data transfer procedure or the state of the signal waveform.

What is claimed is:

1. A data transfer rate deciding method, comprising:
identifying a data transfer rate in a procedure performed before data transfer;
separating data and a clock pulse from a received signal upon reception of the data transfer;
generating a first signal from the clock pulse, the first signal being synchronized with a reference frequency clock pulse based on the data transfer rate identified in the procedure;
generating a second signal from the first signal, the second signal being synchronized with the reference frequency clock pulse based on the data transfer rate identified in the procedure;
outputting a signal for notifying whether or not the data transfer rate identified in the procedure and a data transfer rate of received data differ based on whether or not a value of an exclusive-NOR of the first signal and the second signal is maintained as a low level; and
detecting that the low level is not maintained and outputting an error notification signal, responsive to said outputting a signal.

2. The data transfer rate deciding method of claim 1, wherein the reference frequency clock pulse is replaced with a signal that is a logical AND of an inversion signal and the reference frequency clock pulse, wherein the inversion signal corresponds to the error notification signal inverted.

3. The data transfer rate deciding method of claim 1, wherein in the event that the error notification signal is output in excess of a prescribed number of times, an excess notification signal indicative thereof is provided.

4. The data transfer rate deciding method of claim 3, wherein the prescribed number of times is set arbitrarily.

5. A data transfer rate deciding method, comprising:
separating data and a clock pulse from a received signal upon reception of a data transfer;
generating first signals from the clock pulse, the first signals being respectively synchronized with reference frequency clock pulses of predetermined different frequencies;
generating respective second signals responsive to the first signals;
determining respective exclusive-NOR values of each of the first signals as taken with respect to the respective second signals;
detecting whether or not the respective exclusive-NOR values are maintained at low levels, and outputting responsive thereto respective detection signals indicative of whether or not a data transfer rate of the received signal respectively differs from the data transfer rates corresponding to the reference frequency clock pulses; and
generating error notification signals for each of the reference frequency clock pulses when the low levels are not maintained, responsive to the detection signals.

6. A data transfer rate deciding circuit, comprising:
a receiver that separates data and a clock pulse from a received signal upon reception of a data transfer;
a first generator that generates a first signal from the clock pulse, the first signal being synchronized with a reference frequency clock pulse;
a second generator that generates a second signal responsive to the first signal;
a first circuit that provides an exclusive-NOR value of the first signal and the second signal;
a second circuit that detects whether or not the exclusive-NOR value is maintained at a low level, and that outputs responsive thereto a detection signal indicative of whether or not a data transfer rate of the received signal differs from a data transfer rate corresponding to the reference frequency clock pulse; and a determination circuit that outputs an error notification signal when the low level is not maintained, responsive to the detection signal.

7. The data transfer rate deciding circuit of claim 6, further comprising:
an inverter that inverts the error notification signal to provide an inverted signal; and
a logical AND gate that provides a logical AND value of a reference frequency and the inverted signal, as the reference frequency clock pulse.

8. The data transfer rate deciding circuit of claim 6, further comprising:
a counter that provides an excess notification signal when the error notification signal is output by the determination circuit in excess of a prescribed number of times.

9. The data transfer rate deciding circuit of claim 8, wherein the prescribed number of times is set arbitrarily in the counter.

10. The data transfer rate deciding circuit of claim 8, further comprising:
an inverter that inverts the error notification signal to provide an inverted signal; and
a logical AND gate that provides a logical AND value of a reference frequency and the inverted signal, as the reference frequency clock pulse.

11. The data transfer rate deciding circuit of claim 9, further comprising:
an inverter that inverts the error notification signal to provide an inverted signal; and
a logical AND gate that provides a logical AND value of a reference frequency and the inverted signal, as the reference frequency clock pulse.

12. A data transfer rate deciding circuit comprising:
a receiver that separates data and a clock pulse from a received signal upon reception of a data transfer;
first generators that respectively generate first signals from the clock pulse, the first signals being respectively synchronized with reference frequency clock pulses of predetermined different frequencies;
second generators that respectively generate respective second signals responsive to the first signals;
first circuits that determine respective exclusive-NOR values of each of the first signals as taken with respect to the respective second signals;
second circuits that respectively detect whether or not the exclusive-NOR values are maintained at low levels, and that output responsive thereto respective detection signals indicative of whether or not a data transfer rate of the received signal respectively differs from data transfer rates corresponding to the reference frequency clock pulses; and
determination circuits that respectively output error notification signals when the low levels of the exclusive-NOR values are not maintained, responsive to the respective detection signals.

13. The data transfer deciding circuit of claim 12, wherein when an error notification signal is output, at least a transfer rate deciding operation for each of the reference frequency clock pulses of the different frequencies for which an error notification signal has been output is stopped.

* * * * *